US011687374B2

United States Patent
Sandstrom

(10) Patent No.: US 11,687,374 B2
(45) Date of Patent: Jun. 27, 2023

(54) CONFIGURABLE LOGIC PLATFORM WITH RECONFIGURABLE PROCESSING CIRCUITRY

(71) Applicant: ThroughPuter, Inc., Williamsburg, VA (US)

(72) Inventor: Mark Henrik Sandstrom, Alexandria, VA (US)

(73) Assignee: ThroughPuter, Inc., Williamsburg, VA (US)

( * ) Notice: Subject to any disclaimer, the term of this patent is extended or adjusted under 35 U.S.C. 154(b) by 0 days.

(21) Appl. No.: 17/979,542

(22) Filed: Nov. 2, 2022

(65) Prior Publication Data
US 2023/0046107 A1    Feb. 16, 2023

Related U.S. Application Data

(63) Continuation of application No. 17/859,657, filed on Jul. 7, 2022, now Pat. No. 11,500,682, which is a
(Continued)

(51) Int. Cl.
*G06F 9/50*      (2006.01)
*G06F 9/48*      (2006.01)
(Continued)

(52) U.S. Cl.
CPC .......... *G06F 9/5038* (2013.01); *G06F 9/4881* (2013.01); *G06F 8/656* (2018.02);
(Continued)

(58) Field of Classification Search
CPC ...... G06F 9/5038; G06F 9/4881; G06F 8/656; G06F 9/5027; G06F 15/173; G06F 15/80;
(Continued)

(56) References Cited

U.S. PATENT DOCUMENTS

| 4,402,046 A | 8/1983 | Cox et al. |
| 4,404,628 A | 9/1983 | Angelo |

(Continued)

FOREIGN PATENT DOCUMENTS

| DE | 3340123 A1 | 5/1985 |
| EP | 255857 A2 | 2/1988 |

(Continued)

OTHER PUBLICATIONS

Papadimitriou et al, "Performance of Partial Reconfiguration in FPGA Systems: A Survey and a Cost Model", ACM Transactions on Reconfigurable Technology and Systems, vol. 4, Issue 4, Dec. 28, 2011, pp. 1-24.
(Continued)

*Primary Examiner* — Brian T O Connor
(74) *Attorney, Agent, or Firm* — Gardella Grace P.A.

(57) ABSTRACT

An architecture for a load-balanced groups of multi-stage manycore processors shared dynamically among a set of software applications, with capabilities for destination task defined intra-application prioritization of inter-task communications (ITC), for architecture-based ITC performance isolation between the applications, as well as for prioritizing application task instances for execution on cores of manycore processors based at least in part on which of the task instances have available for them the input data, such as ITC data, that they need for executing.

17 Claims, 7 Drawing Sheets

Related U.S. Application Data continuation of application No. 17/470,926, filed on Sep. 9, 2021, now Pat. No. 11,385,934, which is a continuation of application No. 17/463,098, filed on Aug. 31, 2021, now Pat. No. 11,347,556, which is a continuation of application No. 17/344,636, filed on Jun. 10, 2021, now Pat. No. 11,188,388, which is a continuation of application No. 17/195,174, filed on Mar. 8, 2021, now Pat. No. 11,036,556, which is a continuation of application No. 16/434,581, filed on Jun. 7, 2019, now Pat. No. 10,942,778, which is a continuation of application No. 15/267,153, filed on Sep. 16, 2016, now Pat. No. 10,318,353, which is a continuation of application No. 14/318,512, filed on Jun. 27, 2014, now Pat. No. 9,448,847.

(60) Provisional application No. 61/934,747, filed on Feb. 1, 2014, provisional application No. 61/869,646, filed on Aug. 23, 2013.

(51) Int. Cl.
| | |
|---|---|
| *G06F 8/656* | (2018.01) |
| *G06F 15/80* | (2006.01) |
| *H04L 47/78* | (2022.01) |
| *G06F 15/173* | (2006.01) |

(52) U.S. Cl.
CPC .......... *G06F 9/5027* (2013.01); *G06F 15/173* (2013.01); *G06F 15/80* (2013.01); *G06F 2209/483* (2013.01); *G06F 2209/5021* (2013.01); *H04L 47/78* (2013.01)

(58) Field of Classification Search
CPC ....... G06F 2209/483; G06F 2209/5021; H04L 47/78
See application file for complete search history.

(56) References Cited

U.S. PATENT DOCUMENTS

| | | | |
|---|---|---|---|
| 4,956,771 A | 9/1990 | Neustaedter | |
| 5,031,146 A | 7/1991 | Umina et al. | |
| 5,237,673 A | 8/1993 | Orbits et al. | |
| 5,303,369 A | 4/1994 | Borcherding et al. | |
| 5,452,231 A | 9/1995 | Butts et al. | |
| 5,519,829 A | 5/1996 | Wilson | |
| 5,600,845 A | 2/1997 | Gilson | |
| 5,612,891 A | 3/1997 | Butts et al. | |
| 5,752,030 A | 5/1998 | Konno et al. | |
| 5,809,516 A | 9/1998 | Ukai et al. | |
| 5,931,959 A | 8/1999 | Kwiat | |
| 6,072,781 A | 6/2000 | Feeney et al. | |
| 6,108,683 A | 8/2000 | Kamada et al. | |
| 6,211,721 B1 | 4/2001 | Smetana | |
| 6,212,544 B1 | 4/2001 | Borkenhagen et al. | |
| 6,289,434 B1 | 9/2001 | Roy | |
| 6,289,440 B1 | 9/2001 | Casselman | |
| 6,334,175 B1 | 12/2001 | Chih | |
| 6,345,287 B1 | 2/2002 | Fong et al. | |
| 6,353,616 B1 | 3/2002 | Elwalid et al. | |
| 6,366,157 B1 | 4/2002 | Abdesselem et al. | |
| 6,721,948 B1 | 4/2004 | Morgan | |
| 6,728,959 B1 | 4/2004 | Merkey | |
| 6,769,017 B1 | 7/2004 | Bhat et al. | |
| 6,782,410 B1 | 8/2004 | Bhagat et al. | |
| 6,816,905 B1 | 11/2004 | Sheets et al. | |
| 6,909,691 B1 | 6/2005 | Goyal et al. | |
| 6,912,706 B1 | 6/2005 | Stamm et al. | |
| 7,028,167 B2 | 4/2006 | Soltis, Jr. et al. | |
| 7,058,868 B2 | 6/2006 | Guettaf | |
| 7,093,258 B1 | 8/2006 | Miller et al. | |
| 7,099,813 B2 | 8/2006 | Nightingale | |
| 7,110,417 B1 | 9/2006 | El-Hennawey et al. | |
| 7,177,961 B2 | 2/2007 | Brice, Jr. et al. | |
| 7,178,145 B2 | 2/2007 | Bono | |
| 7,315,897 B1 | 1/2008 | Hardee et al. | |
| 7,328,314 B2 | 2/2008 | Kendall et al. | |
| 7,349,414 B2 * | 3/2008 | Sandstrom | H04J 3/1682 370/258 |
| 7,370,013 B1 | 5/2008 | Aziz et al. | |
| 7,389,403 B1 | 6/2008 | Alpert et al. | |
| 7,406,407 B2 | 7/2008 | Larus | |
| 7,447,873 B1 | 11/2008 | Nordquist | |
| 7,461,376 B2 | 12/2008 | Geye et al. | |
| 7,469,311 B1 | 12/2008 | Tsu et al. | |
| 7,503,045 B1 | 3/2009 | Aziz et al. | |
| 7,518,396 B1 | 4/2009 | Kondapalli et al. | |
| 7,581,079 B2 | 8/2009 | Pechanek | |
| 7,665,092 B1 | 2/2010 | Vengerov | |
| 7,669,035 B2 | 2/2010 | Young et al. | |
| 7,698,541 B1 | 4/2010 | Robles | |
| 7,738,496 B1 | 6/2010 | Raza | |
| 7,743,001 B1 | 6/2010 | Vermeulen et al. | |
| 7,760,625 B2 | 7/2010 | Miyaho et al. | |
| 7,765,547 B2 | 7/2010 | Cismas et al. | |
| 7,802,255 B2 | 9/2010 | Pilkington | |
| 7,805,706 B1 | 9/2010 | Ly et al. | |
| 7,861,063 B1 | 12/2010 | Golla et al. | |
| 7,908,606 B2 | 3/2011 | Depro et al. | |
| 7,984,246 B1 | 7/2011 | Yung et al. | |
| 8,001,549 B2 | 8/2011 | Henmi | |
| 8,015,392 B2 | 9/2011 | Naik et al. | |
| 8,018,961 B2 | 9/2011 | Gopinath et al. | |
| 8,024,731 B1 | 9/2011 | Cornwell et al. | |
| 8,032,889 B2 | 10/2011 | Conrad et al. | |
| 8,046,766 B2 | 10/2011 | Rhine | |
| 8,050,256 B1 | 11/2011 | Bao et al. | |
| 8,059,674 B2 | 11/2011 | Cheung et al. | |
| 8,060,610 B1 | 11/2011 | Herington | |
| 8,087,029 B1 | 12/2011 | Lindholm et al. | |
| 8,095,662 B1 | 1/2012 | Lappas et al. | |
| 8,098,255 B2 | 1/2012 | Fouladi et al. | |
| 8,136,153 B2 | 3/2012 | Zhang et al. | |
| 8,230,070 B2 | 7/2012 | Buyya et al. | |
| 8,271,730 B2 | 9/2012 | Piry et al. | |
| 8,296,434 B1 | 10/2012 | Miller et al. | |
| 8,327,126 B2 | 12/2012 | Bell, Jr. et al. | |
| 8,352,609 B2 | 1/2013 | Maclinovsky et al. | |
| 8,352,611 B2 | 1/2013 | Maddhuri et al. | |
| 8,429,630 B2 | 4/2013 | Nickolov et al. | |
| 8,447,933 B2 | 5/2013 | Nishihara | |
| 8,533,674 B2 | 9/2013 | Abrams et al. | |
| 8,539,207 B1 | 9/2013 | LeGrand | |
| 8,544,014 B2 | 9/2013 | Gopalan et al. | |
| 8,561,183 B2 | 10/2013 | Muth et al. | |
| 8,566,836 B2 | 10/2013 | Ramaraju et al. | |
| 8,595,832 B1 | 11/2013 | Yee et al. | |
| 8,612,330 B1 | 12/2013 | Certain et al. | |
| 8,626,970 B2 | 1/2014 | Craddock et al. | |
| 8,713,572 B2 | 4/2014 | Chambliss et al. | |
| 8,713,574 B2 | 4/2014 | Creamer et al. | |
| 8,738,860 B1 | 5/2014 | Griffin et al. | |
| 8,745,241 B2 | 6/2014 | Waldspurger | |
| 8,762,595 B1 | 6/2014 | Muller et al. | |
| 8,789,065 B2 * | 7/2014 | Sandstrom | G06F 9/5011 370/413 |
| 8,793,698 B1 * | 7/2014 | Sandstrom | H04L 67/1038 718/104 |
| 8,850,574 B1 | 9/2014 | Ansel et al. | |
| 8,881,141 B2 | 11/2014 | Koch et al. | |
| 8,935,491 B2 | 1/2015 | Sandstrom | |
| 9,038,072 B2 | 5/2015 | Nollet et al. | |
| 9,104,453 B2 | 8/2015 | Anand et al. | |
| 9,164,953 B2 | 10/2015 | Lippett | |
| 9,218,195 B2 | 12/2015 | Anderson et al. | |
| 9,262,360 B2 | 2/2016 | Wagh et al. | |
| 9,348,724 B2 | 5/2016 | Ota et al. | |
| 9,390,046 B2 | 7/2016 | Wagh | |
| 9,424,090 B2 | 8/2016 | Sandstrom | |
| 9,448,847 B2 | 9/2016 | Sandstrom | |
| 9,465,667 B1 | 10/2016 | Sandstrom | |

(56) References Cited

U.S. PATENT DOCUMENTS

| | | |
|---|---|---|
| 9,503,093 B2 | 11/2016 | Karras et al. |
| 9,589,088 B1 | 3/2017 | Mishra et al. |
| 9,608,933 B2 | 3/2017 | Emaru |
| 9,632,833 B2 | 4/2017 | Sandstrom |
| 9,690,600 B2 | 6/2017 | Jung et al. |
| 9,697,161 B2 | 7/2017 | Mangano et al. |
| 9,910,708 B2 | 3/2018 | Williamson |
| 10,013,662 B2 | 7/2018 | Brandwine et al. |
| 10,133,599 B1 | 11/2018 | Sandstrom |
| 10,133,600 B2 | 11/2018 | Sandstrom |
| 10,318,353 B2 | 6/2019 | Sandstrom |
| 10,430,242 B2 | 10/2019 | Sandstrom |
| 10,942,778 B2 | 3/2021 | Sandstrom |
| 11,036,556 B1 | 6/2021 | Sandstrom |
| 11,188,388 B2 | 11/2021 | Sandstrom |
| 11,347,556 B2 | 5/2022 | Sandstrom |
| 11,385,934 B2 * | 7/2022 | Sandstrom ............ G06F 9/4881 |
| 11,500,682 B1 * | 11/2022 | Sandstrom ............ G06F 9/5038 |
| 2002/0040400 A1 | 4/2002 | Masters |
| 2002/0056033 A1 | 5/2002 | Huppenthal |
| 2002/0112091 A1 | 8/2002 | Schott et al. |
| 2002/0124012 A1 | 9/2002 | Liem et al. |
| 2002/0129080 A1 | 9/2002 | Hentschel et al. |
| 2002/0141343 A1 | 10/2002 | Bays |
| 2002/0143843 A1 | 10/2002 | Mehta |
| 2002/0169828 A1 | 11/2002 | Blanchard |
| 2003/0018807 A1 | 1/2003 | Larsson et al. |
| 2003/0200408 A1 | 10/2003 | Mekhiel |
| 2003/0235200 A1 | 12/2003 | Kendall et al. |
| 2004/0088488 A1 | 5/2004 | Ober et al. |
| 2004/0111724 A1 | 6/2004 | Libby |
| 2004/0128401 A1 | 7/2004 | Fallon et al. |
| 2004/0158637 A1 | 8/2004 | Lee |
| 2004/0168170 A1 | 8/2004 | Miller |
| 2004/0193806 A1 | 9/2004 | Koga et al. |
| 2004/0210900 A1 | 10/2004 | Jones et al. |
| 2005/0010502 A1 | 1/2005 | Birkestrand et al. |
| 2005/0013705 A1 | 1/2005 | Farkas et al. |
| 2005/0021931 A1 | 1/2005 | Anderson et al. |
| 2005/0036515 A1 | 2/2005 | Cheung et al. |
| 2005/0044344 A1 | 2/2005 | Stevens |
| 2005/0055694 A1 | 3/2005 | Lee |
| 2005/0080999 A1 | 4/2005 | Angsmark et al. |
| 2005/0182838 A1 | 8/2005 | Sheets et al. |
| 2005/0188372 A1 | 8/2005 | Inoue et al. |
| 2005/0193186 A1 | 9/2005 | Gazsi et al. |
| 2005/0198476 A1 | 9/2005 | Gazsi et al. |
| 2005/0235070 A1 | 10/2005 | Young et al. |
| 2005/0268298 A1 | 12/2005 | Hunt et al. |
| 2005/0278551 A1 | 12/2005 | Goodnow et al. |
| 2006/0036774 A1 | 2/2006 | Schott et al. |
| 2006/0059485 A1 | 3/2006 | Onufryk et al. |
| 2006/0061794 A1 | 3/2006 | Ito et al. |
| 2006/0070078 A1 | 3/2006 | Dweck et al. |
| 2006/0075265 A1 | 4/2006 | Hamaoka et al. |
| 2006/0179194 A1 | 8/2006 | Jensen |
| 2006/0195847 A1 | 8/2006 | Amano et al. |
| 2006/0212870 A1 | 9/2006 | Arndt et al. |
| 2006/0218376 A1 | 9/2006 | Pechanek |
| 2007/0074011 A1 | 3/2007 | Borkar et al. |
| 2007/0153802 A1 | 7/2007 | Anke et al. |
| 2007/0220517 A1 | 9/2007 | Lippett |
| 2007/0226482 A1 | 9/2007 | Borkar et al. |
| 2007/0283311 A1 | 12/2007 | Karoubalis et al. |
| 2007/0291576 A1 | 12/2007 | Yang |
| 2008/0046997 A1 | 2/2008 | Wang |
| 2008/0077927 A1 | 3/2008 | Armstrong et al. |
| 2008/0086395 A1 | 4/2008 | Brenner et al. |
| 2008/0189703 A1 | 8/2008 | Im et al. |
| 2008/0201716 A1 | 8/2008 | Du et al. |
| 2008/0222640 A1 | 9/2008 | Daly et al. |
| 2008/0244588 A1 | 10/2008 | Leiserson et al. |
| 2008/0256339 A1 | 10/2008 | Xu et al. |
| 2008/0288747 A1 | 11/2008 | Inglett et al. |
| 2009/0037554 A1 | 2/2009 | Herington |
| 2009/0049443 A1 | 2/2009 | Powers et al. |
| 2009/0070762 A1 | 3/2009 | Franaszek et al. |
| 2009/0178047 A1 | 7/2009 | Astley et al. |
| 2009/0187756 A1 | 7/2009 | Nollet et al. |
| 2009/0198866 A1 | 8/2009 | Chen et al. |
| 2009/0265712 A1 | 10/2009 | Herington |
| 2009/0282477 A1 | 11/2009 | Chen et al. |
| 2009/0327446 A1 | 12/2009 | Wittenschlaeger |
| 2010/0043008 A1 | 2/2010 | Marchand |
| 2010/0049963 A1 | 2/2010 | Bell, Jr. et al. |
| 2010/0058346 A1 | 3/2010 | Narang et al. |
| 2010/0100883 A1 | 4/2010 | Booton |
| 2010/0131955 A1 | 5/2010 | Brent et al. |
| 2010/0153700 A1 | 6/2010 | Capps, Jr. et al. |
| 2010/0153955 A1 | 6/2010 | Sirota et al. |
| 2010/0162230 A1 | 6/2010 | Chen et al. |
| 2010/0192155 A1 | 7/2010 | Nam et al. |
| 2010/0205602 A1 | 8/2010 | Zedlewski et al. |
| 2010/0232396 A1 | 9/2010 | Jing et al. |
| 2010/0268889 A1 | 10/2010 | Conte et al. |
| 2010/0287320 A1 | 11/2010 | Querol et al. |
| 2010/0333099 A1 | 12/2010 | Kupferschmidt et al. |
| 2011/0014893 A1 | 1/2011 | Davis et al. |
| 2011/0035749 A1 | 2/2011 | Krishnakumar et al. |
| 2011/0047546 A1 | 2/2011 | Kivity et al. |
| 2011/0050713 A1 | 3/2011 | McCrary et al. |
| 2011/0055480 A1 | 3/2011 | Guyetant et al. |
| 2011/0078411 A1 | 3/2011 | Maclinovsky et al. |
| 2011/0096667 A1 | 4/2011 | Arita et al. |
| 2011/0119674 A1 | 5/2011 | Nishikawa |
| 2011/0154348 A1 | 6/2011 | Elnozahy et al. |
| 2011/0161969 A1 | 6/2011 | Arndt et al. |
| 2011/0173432 A1 | 7/2011 | Cher et al. |
| 2011/0197048 A1 | 8/2011 | Chung et al. |
| 2011/0247012 A1 | 10/2011 | Uehara |
| 2011/0249678 A1 | 10/2011 | Bonicatto et al. |
| 2011/0258317 A1 | 10/2011 | Sinha et al. |
| 2011/0296138 A1 | 12/2011 | Carter et al. |
| 2011/0321057 A1 | 12/2011 | Mejdrich et al. |
| 2012/0005473 A1 | 1/2012 | Hofstee et al. |
| 2012/0022832 A1 | 1/2012 | Shannon et al. |
| 2012/0079501 A1 | 3/2012 | Sandstrom |
| 2012/0089985 A1 | 4/2012 | Adar et al. |
| 2012/0173734 A1 | 7/2012 | Kimbrel et al. |
| 2012/0216012 A1 | 8/2012 | Vorbach et al. |
| 2012/0221886 A1 | 8/2012 | Bareness et al. |
| 2012/0222038 A1 | 8/2012 | Katragadda et al. |
| 2012/0222042 A1 | 8/2012 | Chess et al. |
| 2012/0246450 A1 | 9/2012 | Abdallah |
| 2012/0266176 A1 | 10/2012 | Vojnovic et al. |
| 2012/0303809 A1 | 11/2012 | Patel et al. |
| 2012/0324458 A1 | 12/2012 | Peterson et al. |
| 2013/0013903 A1 | 1/2013 | Bell, Jr. et al. |
| 2013/0222402 A1 | 8/2013 | Peterson et al. |
| 2013/0325998 A1 | 12/2013 | Hormuth et al. |
| 2014/0089635 A1 | 3/2014 | Shifer et al. |
| 2014/0123135 A1 | 5/2014 | Huang et al. |
| 2014/0149993 A1 | 5/2014 | Sandstrom |
| 2014/0181501 A1 | 6/2014 | Hicok et al. |
| 2014/0317378 A1 | 10/2014 | Lippett |
| 2014/0331236 A1 | 11/2014 | Mitra et al. |
| 2014/0372167 A1 | 12/2014 | Hillier |
| 2015/0100772 A1 | 4/2015 | Jung et al. |
| 2015/0178116 A1 | 6/2015 | Jorgensen et al. |
| 2015/0277920 A1 | 10/2015 | Bradbury et al. |
| 2015/0339798 A1 | 11/2015 | Peterson et al. |
| 2015/0378776 A1 | 12/2015 | Lippett |
| 2016/0034295 A1 | 2/2016 | Cochran |
| 2016/0048394 A1 | 2/2016 | Vorbach et al. |
| 2016/0080201 A1 | 3/2016 | Huang et al. |
| 2016/0378538 A1 | 12/2016 | Kang |
| 2017/0024573 A1 | 1/2017 | Bhattacharyya et al. |
| 2017/0097838 A1 | 4/2017 | Nagapudi et al. |
| 2017/0310794 A1 | 10/2017 | Smith et al. |
| 2018/0089119 A1 | 3/2018 | Khan et al. |
| 2018/0097709 A1 | 4/2018 | Box et al. |
| 2019/0361745 A1 | 11/2019 | Sandstrom |
| 2020/0192454 A1 | 6/2020 | de Rochemont |
| 2021/0191781 A1 | 6/2021 | Sandstrom |

(56) References Cited

U.S. PATENT DOCUMENTS

| | | |
|---|---|---|
| 2021/0303361 A1 | 9/2021 | Sandstrom |
| 2021/0397484 A1 | 12/2021 | Sandstrom |
| 2021/0406083 A1 | 12/2021 | Sandstrom |
| 2022/0342715 A1 | 10/2022 | Sandstrom |

FOREIGN PATENT DOCUMENTS

| | | |
|---|---|---|
| EP | 889622 A2 | 7/1999 |
| EP | 2309388 A1 | 4/2011 |
| EP | 2704022 | 3/2014 |
| GB | 1236177 A | 6/1971 |
| GB | 2145255 A | 3/1985 |
| GB | 2272311 A | 5/1994 |
| JP | 05197619 A | 8/1993 |
| JP | 06004314 A | 1/1994 |
| JP | 11353291 A | 12/1999 |
| SU | 1327106 A1 | 7/1987 |
| WO | 2000070426 A2 | 11/2000 |
| WO | 02/09285 A2 | 1/2002 |
| WO | 2011123467 A1 | 10/2011 |
| WO | 2012/040691 A1 | 3/2012 |

OTHER PUBLICATIONS

Russinovich, M. and Solomon, D., "Microsoft Windows Internals, Fourth Edition: Microsoft Windows Server 2003, Windows XP, and Windows 2000", Microsoft Press, Dec. 1, 2004.
Tuan, Vu Manh, "A Study on a Multitasking Environment for Dynamically Reconfigurable Processors", School of Science for Open and Evironmental Systems, Graduate School of Science and Technology, Keio University, 2009.
Tullsen, Dean Michael, "Simultaneous Multithreading", University of Washington, 1996.
Wang, Zheng, "Internet QoS Architectures and Mechanisms for Quality of Service", Morgan Kaufmann, 2001. (Partial reference submitted, Chapter 2, pp. 60-64).
Yadev, et al, "Scheduling Algorithm: Tasks Scheduling Algorithm for Multiple Processors With Dynamic Reassignment", Journal of Computer Systems, Networks, and Communications, Jan. 1, 2008.
[#HADOOP-3445] Implementing core scheduler functionality in Resource Manager (V1) for Hadoop, Accessed May 18, 2018, 12 pages, https://issues.apache.org/jira/si/jira.issueviews:issue-html/HADOOP-3445/HADOOP-3445.html. (previously submitted in related U.S. Appl. No. 15/267,153).
7 Series FPGAs Configuration User Guide, a Xilinx, Inc. User Guide UG470 (v1.4) Jul. 19, 2012. (previously submitted in related U.S. Appl. No. 15/267,153).
Borges, et al., "Sun Grid Engine, a new scheduler for EGEE middleware," (2018). (previously submitted in related U.S. Appl. No. 15/267,153).
Cooper, Brian F. et al., Building a Cloud for Yahoo!, 2009, 9 pages, IEEE Computer Society Technical Committee or Data Engineering, https://www.researchgate.net/profile/Rodrigo_Fonseca3/publication/220282767_Building_a_Cloud_for_Yahoo/links/0912f5109da99ddf6a000000/Building-a-Cloud-for-Yahoo.pdf. (previously submitted in related U.S. Appl. No. 15/267,153).
Dye, David, Partial Reconfiguration of Xilinx FPGAs Using ISE Design Suite, a Xilinx, Inc. White Paper WP374 (v1.2), May 30, 2012. (previously submitted in related U.S. Appl. No. 15/267,153).
Examination Report issued in IN Application No. 1219/MUM/2012 dated Jul. 19, 2019. (previously submitted in related U.S. Appl. No. 17/195,174).
Examination Report issued in IN Application No. 2414/MUM/2011 dated Jul. 25, 2019. (previously submitted in related U.S. Appl. No. 17/195,174).
Examiner's Answer issued in related U.S. Appl. No. 13/297,455 dated Feb. 10, 2016, 9 pages. (previously submitted in related U.S. Appl. No. 15/267,153).
Final Rejection issued in related U.S. Appl. No. 13/297,455 dated Apr. 18, 2013, 18 pages. (previously submitted in related U.S. Appl. No. 15/267,153).
Final Rejection issued in related U.S. Appl. No. 13/297,455 dated Mar. 26, 2015, 14 pages. (previously submitted in related U.S. Appl. No. 15/267,153).
Final Rejection issued in related U.S. Appl. No. 13/297,455 dated Sep. 3, 2014, 18 pages. (previously submitted in related U.S. Appl. No. 15/267,153).
Final Rejection issued in related U.S. Appl. No. 14/521,490 dated Jul. 28, 2017, 16 pages. (previously submitted in related U.S. Appl. No. 15/267,153).
First Examination Report issued in IN Application No. 401/MUM/2011 dated Nov. 9, 2018. (previously submitted in related U.S. Appl. No. 15/267,153).
Fischer, Michael J. et al., Assigning Tasks for Efficiency in Hadoop, 2010, 11 pages, https://www.researchgate.net/profile/Xueyuan_Su/publication/221257628_Assigning_tasks_for_efficiency_in_Hadoop/links/53df31100cf216e4210c5fd1/Assigning-tasks-for-efficiency-in-Hadoop.pdf. (previously submitted in related U.S. Appl. No. 15/267,153).
Gentzsch, et al., "Sun Grid Engine: Towards Creating a Compute Power Grid." IEEE Computer Society, Proceedings of the 1st International Symposium on Cluster Computing and the Grid (2001). (previously submitted in related U.S. Appl. No. 15/267,153).
Ghodsi, Ali, et al., Dominant Resource Fairness: Fair Allocation of Multiple Resource Types, Proceedings of NSDI 11: 8th USENIX Symposium on Networked Systems Design and Implementation, Mar. 30, 2011, pp. 323-336. (previously submitted in related U.S. Appl. No. 15/267,153).
Han, Wei, et al., Multi-core Architectures with Dynamically Reconfigurable Array Processors for the WiMAx Physical layer, pp. 115-120, 2008. (previously submitted in related U.S. Appl. No. 15/267,153).
Hindman, Benjamin, et al., Mesos: A Platform for Fine-Grained Resource Sharing in the Data Center, Proceedings of NSDI '11: 8th USENIX Symposium on Networked Systems Design and Implementation, Mar. 30, 2011, pp. 295-308 (previously submitted in related U.S. Appl. No. 15/267,153).
Isard, Michael et al., Quincy: Fair Scheduling for Distributed Computing Clusters, Accessed May 18, 2018, 20 pages, https://www.sigops.org/sosp/sosp09/papers/isard-sosp09.pdf. (previously submitted in related U.S. Appl. No. 15/267,153).
Ismail, M. I., et al., "Program-based static allocation policies for highly parallel computers," Proceedings International Phoenix Conference on Computers and Communications, Scottsdale, AZ, 1995, pp. 61-68. (previously submitted in related U.S. Appl. No. 15/267,153).
Jean, J et al., Dynamic reconfirmation to support concurrent applications, IEEE Transactions on Computers, vol. 48, Issue 6, pp. 591-602, Jun. 1999. (previously submitted in related U.S. Appl. No. 15/267,153).
Lamonnier et al., Accelerate Partial Reconfiguration with a 100% Hardware Solution, Xcell Journal, Issue 79, Second Quarter 2012, pp. 44-49. (previously submitted in related U.S. Appl. No. 15/267,153).
Lim, Harold C. et al., Automated Control in Cloud Computing: Challenges and Opportunities, Jun. 19, 2009, 6 pages, ACM, https://www2.cs.duke.edu/nicl/pub/papers/acdc09-lim.pdf. (previously submitted in related U.S. Appl. No. 15/267,153).
Loh, Gabriel H., 3 D-Stacked Memory Architectures for Multi-Core Processors, IEEE Computer Society, pp. 453-464, 2008. (previously submitted in related U.S. Appl. No. 15/267,153).
McCan, Cathy, et al., A Dynamic Processor Allocation Policy for Multiprogrammed Shared-Memory Multiprocessors, 1993, ACM, 33 pages (146-178). (previously submitted in related U.S. Appl. No. 15/267,153).
Mohan, Shiwali et al., Towards a Resource Aware Scheduler in Hadoop, Dec. 21, 2009, 10 pages, Computer Science and Engineering, University of Michigan, Ann Arbor, https://pdfs.semanticscholar.org/d2e3/c7b60967934903f0837219772c6972ede93e.pdf (previously submitted in related U.S. Appl. No. 15/267,153).
Morishita, et al., Design of a multiprocessor system supporting interprocess message communication, Journal of the Faculty of Engineering, University of Tokyo, Series A, No. 24, 1986, pp. 36-37. (previously submitted in related U.S. Appl. No. 15/267,153).

(56) References Cited

OTHER PUBLICATIONS

Murthy, Arun C., et al., Architecture of Next Generation Apache Hadoop MapReduce Framework, 2011, 14 pages. (previously submitted in related U.S. Appl. No. 15/267,153).
Non-Final Rejection issued in related U.S. Appl. No. 13/297,455 dated Jun. 19, 2014, 15 pages. (previously submitted in related U.S. Appl. No. 15/267,153).
Non-Final Rejection issued in related U.S. Appl. No. 13/297,455 dated Mar. 14, 2013, 23 pages. (previously submitted in related U.S. Appl. No. 15/267,153).
Non-Final Rejection issued in related U.S. Appl. No. 13/297,455 dated Oct. 3, 2014, 29 pages. (previously submitted in related U.S. Appl. No. 15/267,153).
Non-Final Rejection issued in related U.S. Appl. No. 14/318,512 dated Feb. 12, 2016, 25 pages. (previously submitted in related U.S. Appl. No. 15/267,153).
Non-Final Rejection issued in related U.S. Appl. No. 14/318,512 dated Jun. 1, 2016, 18 pages. (previously submitted in related U.S. Appl. No. 15/267,153).
Non-Final Rejection issued in related U.S. Appl. No. 14/521,490 dated May 17, 2018, 23 pages. (previously submitted in related U.S. Appl. No. 15/267,153).
Non-Final Rejection issued in related U.S. Appl. No. 14/521,490 dated May 4, 2017, 19 pages. (previously submitted in related U.S. Appl. No. 15/267,153).
Non-Final Rejection issued in related U.S. Appl. No. 15/267,153 dated Aug. 24, 2018, 54 pages. (previously submitted in related U.S. Appl. No. 17/195,174).
Non-Final Rejection issued in related U.S. Appl. No. 15/267,153 dated Mar. 9, 2018, 23 pages. (previously submitted in related U.S. Appl. No. 17/195,174).
Notice of Allowance issued in U.S. Appl. No. 15/267,153 dated Jan. 17, 2019. (previously submitted in related U.S. Appl. No. 17/195,174).
Partial Reconfiguration Tutorial, PlanAhead Design Tool, a Xilinx, Inc. User Guide UG743 (v14.1) May 8, 2012. (previously submitted in related U.S. Appl. No. 15/267,153).
Partial Reconfiguration User Guide, a Xilinx, Inc. user document UG702 (v14.2) Jul. 25, 2012. (previously submitted in related U.S. Appl. No. 15/267,153).
Sandholm, Thomas et al., Dynamic Proportional Share Scheduling in Hadoop, Accessed May 18, 2018, 20 pages, Hewlett-Packard Laboratories, http://citeseerx.ist.psu.edu/viewdoc/download?doi=10.1.1.591.4477&rep=rep1&type=pdf. (previously submitted in related U.S. Appl. No. 15/267,153).
Shankar, Uma, Oracle Grid Engine Administration Guide, Release 6.2 Update 7, Aug. 2011, 202 pages, Oracle Corporation. (previously submitted in related U.S. Appl. No. 15/267,153).
Shieh, Alan, et al., Sharing the Data Center Network, Proceedings of NSDI '11: 8th USENIX Symposium on Networked Systems Design and Implementation, Mar. 30, 2011, pp. 309-322. (previously submitted in related U.S. Appl. No. 15/267,153).
Singh, Deshanand, Implementing FPGA Design with the OpenCL Standard, an Altera Corporation White Paper WP-01173-2.0, Nov. 2012. (previously submitted in related U.S. Appl. No. 15/267,153).
Tam et al., Fast Configuration of PCI Express Technology through Partial Reconfiguration, a Xilinx, Inc. Application Note XAPP883 (v1.0) Nov. 19, 2010. (previously submitted in related U.S. Appl. No. 15/267,153).
Tian, Chao et al., A Dynamic MapReduce Scheduler for Heterogeneous Workloads, 2009, pp. 218-224, IEEE Computer Society, https://pdfs.semanticscholar.org/679f/73d810e2ac9e2e84de798d853b6fb0b0206a.pdf. (previously submitted in related U.S. Appl. No. 15/267,153).
Tsai, Chang-Hao, System Architectures with Virtualized Resources in a Large-Scale Computing Infrastructure, 2009, 146 pages, Computer Science and Engineering, The University of Michigan, https://kabru.eecs.umich.edu/papers/thesis/chtsai-thesis.pdf (previously submitted in related U.S. Appl. No. 15/267,153).
Warneke et al., "Nephele: efficient parallel data processing in the cloud," MTAGS '09 Proceedings of the 2nd Workshop on Many-Task Computing on Grids and Supercomputers, Article No. 8 (2009). (previously submitted in related U.S. Appl. No. 17/195,174).
Wen et al., "Minimizing Migration on Grid Environments: an Experience on Sun Grid Engine" Journal of Information Technology and Applications, vol. 1, No. 4, pp. 297-304 (2007). (previously submitted in related U.S. Appl. No. 15/267,153).
Zaharia, Matei et al., Job Scheduling for Multi-User MapReduce Clusters, Apr. 30, 2009, actual publication date unknown,18 pages, Electrical Engineering and Computer Sciences, University of California at Berkeley, https://www2.eecs.berkeley.edu/Pubs/TechRpts/2009/EECS-2009-55.pdf. (previously submitted in related U.S. Appl. No. 15/267,153).
Al-Fares et al., "Hedera: Dynamic Flow Scheduling for Data Center Networks", Nsdi, vol. 10, No. 8, Apr. 28, 2010. (previously submitted in related U.S. Appl. No. 17/195,174).
Binotto et al., "Dynamic Self-Rescheduling of Tasks over a Heterogeneous Platform," 2008 International Conference on Reconfigurable Computing and FPGAs, 2008, pp. 253-258. (previously submitted in related U.S. Appl. No. 17/195,174).
Clemente et al., "A Task-Graph Execution Manager for Reconfigurable Multi-tasking Systems," pp. 73-83, 2010, Microprocessors and Microsystems, vol. 34, Issues 2-4. (previously submitted in related U.S. Appl. No. 17/195,174).
Ebrahimi et al., "Fairness via Source Throttling: A Configurable and High-Performance Fairness Substrate for Multi-Core Memory Systems", ACM SIGPLAN Notices, vol. 45, No. 3, Mar. 2010, pp. 335-346. (previously submitted in related U.S. Appl. No. 17/195,174).
George et al., "Novo-G: At the Forefront of Scalable Reconfigurable Supercomputing", Computing in Science Engineering, vol. 13, Issue 1, Dec. 30, 2010, pp. 82-86. (previously submitted in related U.S. Appl. No. 17/195,174).
Gohringer et al., "CAP-OS: Operating system for runtime scheduling, task mapping and resource management on reconfigurable multiprocessor architectures," 2010 IEEE International Symposium on Parallel & Distributed Processing, Workshops and Phd Forum (IPDPSW), 2010, pp. 1-8, doi: 10.1109/IPDPSW.2010.5470732 (previously submitted in related U.S. Appl. No. 17/195,174).
Gohringer et al., "Operating System for Runtime Reconfigurable Multiprocessor Systems," International Journal of Reconfigurable Computing, Feb. 14, 2011, pp. 1-17, vol. 2011, Hindawi Publishing Corporation. (previously submitted in related U.S. Appl. No. 17/195,174).
Jacobs et al., "Reconfigurable Fault Tolerance: A Comprehensive Framework for Reliable and Adaptive FPGA-Based Space Computing," ACM Trans. Reconfigurable Technol. Syst. 5, 4, Article 21 (Dec. 2012), 30 pages. (previously submitted in related U.S. Appl. No. 17/195,174).
Joselli et al., "An architecture with automatic load balancing for real-time simulation and visualization systems," Journal of Computational Interdisciplinary Sciences, 2010, 1(3): 207-224. (previously submitted in related U.S. Appl. No. 17/195,174).
May et al., "Queueing Theory Modeling of a CPU-GPU System," Northrup Grumman Corporation, Electronic Systems Sector, May 11, 2010, 2 pages. (previously submitted in related U.S. Appl. No. 17/195,174).
Notice of Allowance issued in U.S. Appl. No. 16/434,581 dated Oct. 27, 2020. (previously submitted in related U.S. Appl. No. 17/195,174).
Odajima et al., "GPU/CPU Work Sharing with Parallel Language XcalableMP-dev for Parallelized Accelerated Computing," 2012 41st International Conference on Parallel Processing Workshops, Pittsburgh, PA, 2012, pp. 97-106, doi: 10.1109/ICPPW.2012.16. (previously submitted in related U.S. Appl. No. 17/195,174).
Ranjan et al., "Parallelizing a Face Detection and Tracking System for Multi-Core Processors," Proceedings of the 2012 9th Conference on Computer and Robot Vision, CRV 2012 (2012), pp. 290-297, 10.1109/CRV.2012.45. (previously submitted in related U.S. Appl. No. 17/195,174).
Roy et al., "Efficient Autoscaling in the Cloud using Predictive Models for Workload Forecasting", 2011 IEEE 4th International Conference on Cloud Computing, Washington DC, Jul. 4-9, 2011, pp. 500-507. (previously submitted in related U.S. Appl. No. 17/195,174).

(56) References Cited

OTHER PUBLICATIONS

Supplemental Notice of Allowability issued in U.S. Appl. No. 16/014,658 dated Sep. 18, 2018, 34 pages. (previously submitted in related U.S. Appl. No. 17/195,174).
Supplemental Notice of Allowability issued in U.S. Appl. No. 16/014,674 dated Sep. 7, 2018, 26 pages. (previously submitted in related U.S. Appl. No. 17/195,174).
Toss, Julio, "Work Stealing Inside GPUs," Universidade Federal do Rio Grande do Sul. Instituto de Informática, 39 pages, 2011, Curso de Ciência da Computação: Ênfase em Ciência da Computação: Bacharelado. (previously submitted in related U.S. Appl. No. 17/195,174).
Wu et al., "Runtime Task Allocation in Multicore Packet Processing Systems," IEEE Transactions on Parallel and Distributed Systems, vol. 23, No. 10, pp. 1934-1943, Oct. 2012, doi: 10.1109/TPDS. 2012.56. (previously submitted in related U.S. Appl. No. 17/195,174).
Ziermann et al., "Adaptive Traffic Scheduling Techniques for Mixed Real-Time and Streaming Applications on Reconfigurable Hardware," 2010 IEEE International Symposium on Parallel & Distributed Processing, Workshops and Phd Forum (IPDPSW), 2010, pp. 1-4, doi: 10.1109/IPDPSW.2010.5470738. (previously submitted in related U.S. Appl. No. 17/195,174).
Notice of Allowance issued in U.S. Appl. No. 17/195,174 dated May 14, 2021. (previously submitted in related U.S. Appl. No. 17/470,926).
Hutchings et al., "Implementation approaches for reconfigurable logic applications," Field-Programmable Logic and Applications. Springer Berlin/Heidelberg, 1995. <http://citeseerx.ist.psu.edu/viewdoc/download?doi=10.1.1.17.3063&rep=rep1&type=pdf>. (previously submitted in related U.S. Appl. No. 17/470,926).
"Introduction to Implementing Design Security with Microsemi SmartFusion2 and IGLOO2 FPGAs," by Microsemi, Nov. 2013, 13 pages. (previously submitted in related U.S. Appl. No. 17/470,926).
Shin et al., "Avant-Guard: Scalable and Vigilant Switch Flow Management in Software-Defined Networks," 2013. (previously submitted in related U.S. Appl. No. 17/470,926).
"Design of a Secure Plane Bridge," Microsemi, 2013. (previously submitted in related U.S. Appl. No. 17/470,926).
Unnikrishnan et al., "ReClick—A Modular Dataplane Design Framework for FPGA-Based Network Virtualization," 2011 ACM/IEEE Seventh Symposium on Architectures for Networking and Communications Systems, 2011, pp. 145-155, doi: 10.1109/ANCS.2011.31. (previously submitted in related U.S. Appl. No. 17/470,926).
Notice of Allowance issued in U.S. Appl. No. 17/344,636 dated Oct. 14, 2021. (previously submitted in related U.S. Appl. No. 17/470,926).
Supplemental Notice of Allowability issued in U.S. Appl. No. 17/344,636 dated Nov. 5, 2021. (previously submitted in related U.S. Appl. No. 17/470,926).
Non-Final Office Action issued in U.S. Appl. No. 17/463,098 dated Nov. 26, 2021. (previously submitted in related U.S. Appl. No. 17/470,926).
Non-Final Rejection issued in related U.S. Appl. No. 17/747,839 dated Aug. 16, 2022. (previously submitted in related U.S. Appl. No. 17/859,657).
Notice of Allowance issued in U.S. Appl. No. 17/859,657 dated Sep. 21, 2022.
Supplemental Notice of Allowability issued in U.S. Appl. No. 17/859,657 dated Oct. 13, 2022.

Decision Granting Institution of Inter Partes Review in IPR2022-00527 dated Sep. 19, 2022.
Decision Granting Institution of Inter Partes Review in IPR2022-00528 dated Sep. 19, 2022.
Decision Granting Institution of Inter Partes Review in IPR2022-00574 dated Sep. 19, 2022.
Decision Denying Institution of Inter Partes Review in IPR2022-00757 dated Nov. 1, 2022.
Decision Denying Institution of Inter Partes Review in IPR2022-00758 dated Oct. 11, 2022.
Agrawal et al "Adaptive scheduling with parallelism feedback." Proceedings of the eleventh ACM SIGPLAN symposium on Principles and practice of parallel programming. Mar. 29, 2006. pp. 100-109.
Aron et al "Cluster reserves: A mechanism for resource management in cluster-based network servers." Proceedings of the 2000 ACM SIGMETRICS international conference on Measurement and modeling of computer systems. Jun. 1, 2000. pp. 90-101.
Blelloch et al "Provably efficient scheduling for languages with fine-grained parallelism." Journal of the ACM (JACM) vol. 46, Issue 2, Mar. 1, 1999, pp. 281-321.
Chen et al "Configuration-sensitive process scheduling for FPGA-based computing platforms." Proceedings Design, Automation and Test in Europe Conference and Exhibition. vol. 1. IEEE, Feb. 16, 2004, pp. 486-493.
Coffman Jr., E.G. and Whitt, W., "Recent asymptotic results in the probabilistic analysis of schedule makespans." (1995).
Compton, K., and Hauck, S., "Reconfigurable computing: a survey of systems and software." ACM Computing Surveys (csuR) vol. 34, Issue 2 (Jun. 1, 2002), pp. 171-210.
Feitelson, D. G., "Job Scheduling in Multiprogrammed Parallel Systems", Institute of Computer Science, The Hebrew University, Aug. 1997.
Gabor et al, "Service Level Agreement for Multithreaded Processors", ACM Transactions on Architecture and Code Optimization, vol. 6, Issue 2, Jun. 2009, pp. 1-33.
Gregori, E. et al., eds. Networking 2002: Networking Technologies, Services, and Protocols; Performance of Computerand Communication Networks; Mobile and Wireless Communications: Second International IFIP-TC6 Networking Conference, Pisa, Italy, May 19-24, 2002 Proceedings. vol. 2345. Springer Science & Business Media, 2007. (Partial reference submitted, pp. 65-68).
Karam, et al, "Trends In Multi-Core DSP Platforms", IEEE Signal Processing Magazine, vol. 26, No. 6, Nov. 2009, pp. 38-49.
Kumar, et al, "Single-ISA Heterogeneous Multi-Core Architectures: The Potential for Processor Power Reduction". Proceedings. 36th Annual IEEE/ACM International Symposium on Microarchitecture, Dec. 5, 2003, pp. 81-92.
Lety, et al, "MiMaze, a 3D Multi-Player Game on the Internet", Proceedings of the 4th International Conference on Virtual System and Multimedia, Gifu, Japan. vol. 1. 1998.
Dingchao et al, "Scheduling Task Graphs Onto Heterogeneous Multiprocessors," Proceedings of TENCON '94—1994 IEEE Region 10's 9th Annual International Conference on: 'Frontiers of Computer Technology', vol. 2, 1994, pp. 556-563.
Magro et al, "Hyper-Threading Technology: Impact on Compute-Intensive Workloads", Intel Technology Journal, vol. 6, Issue 1, Feb. 14, 2002.

* cited by examiner

CONFIGURABLE LOGIC PLATFORM WITH RECONFIGURABLE PROCESSING CIRCUITRY

CROSS-REFERENCE TO RELATED APPLICATIONS

This application is a continuation of U.S. application Ser. No. 17/859,657 filed Jul. 7, 2022, which is a continuation of U.S. application Ser. No. 17/470,926 filed Sep. 9, 2021 (now U.S. Pat. No. 11,385,934), which is a continuation application of U.S. application Ser. No. 17/463,098 filed Aug. 31, 2021 (now U.S. Pat. No. 11,347,556), which is a continuation application of U.S. application Ser. No. 17/344,636 filed Jun. 10, 2021 (now U.S. Pat. No. 11,188,388), which is a continuation application of U.S. application Ser. No. 17/195,174 filed Mar. 8, 2021 (now U.S. Pat. No. 11,036,556), which is a continuation application of U.S. application Ser. No. 16/434,581 filed Jun. 7, 2019 (now U.S. Pat. No. 10,942,778), which is a continuation application of U.S. application Ser. No. 15/267,153 filed Sep. 16, 2016 (now U.S. Pat. No. 10,318,353), which is a continuation application of U.S. application Ser. No. 14/318,512 filed Jun. 27, 2014 (now U.S. Pat. No. 9,448,847), which claims the benefit and priority of the following provisional applications:

[1] U.S. Provisional Application No. 61/934,747 filed Feb. 1, 2014; and
[2] U.S. Provisional Application No. 61/869,646 filed Aug. 23, 2013; This application is also related to the following patented applications:
[3] U.S. Utility application Ser. No. 13/184,028, filed Jul. 15, 2011;
[4] U.S. Utility application Ser. No. 13/270,194, filed Oct. 10, 2011;
[5] U.S. Utility application Ser. No. 13/277,739, filed Nov. 21, 2011;
[6] U.S. Utility application Ser. No. 13/297,455, filed Nov. 16, 2011;
[7] U.S. Utility application Ser. No. 13/684,473, filed Nov. 23, 2012;
[8] U.S. Utility application Ser. No. 13/717,649, filed Dec. 17, 2012;
[9] U.S. Utility application Ser. No. 13/901,566, filed May 24, 2013; and
U.S. Utility application Ser. No. 13/906,159, filed May 30, 2013.

All above identified applications are hereby incorporated by reference in their entireties for all purposes.

BACKGROUND

Technical Field

This invention pertains to the field of information processing, particularly to techniques for managing execution of multiple concurrent, multi-task software programs on parallel processing hardware.

Descriptions of the Related Art

Conventional microprocessor and computer system architectures rely on system software for handling runtime matters relating to sharing processing resources among multiple application programs and their instances, tasks etc., as well as orchestrating the concurrent (parallel and/or pipelined) execution between and within the individual applications sharing the given set of processing resources. However, the system software consumes by itself ever increasing portions of the system processing capacity, as the number of applications, their instances and tasks and the pooled processing resources would grow, as well as the more frequently the optimizations of the dynamic resource management among the applications and their tasks would be needed to be performed, in response to variations in the applications' and their instances' and tasks' processing loads etc. variables of the processing environment. As such, the conventional approaches for supporting dynamic execution of concurrent programs on shared processing capacity pools will not scale well.

This presents significant challenges to the scalability of the networked utility ('cloud') computing model, in particular as there will be a continuously increasing need for greater degrees of concurrent processing also at intra-application levels, in order to enable increasing individual application on-time processing throughput performance, without the automatic speed-up from processor clock rates being available due to the practical physical and economic constraints faced by the semiconductor etc. physical hardware implementation technologies.

To address the challenges per above, there is a need for inventions enabling scalable, multi-application dynamic concurrent execution on parallel processing systems, with high resource utilization efficiency, high application processing on-time throughput performance, as well built-in, architecture based security and reliability.

SUMMARY

An aspect of the invention provides systems and methods for arranging secure and reliable, concurrent execution of a set of internally parallelized and pipelined software programs on a pool of processing resources shared dynamically among the programs, wherein the dynamic sharing of the resources is based at least in part on i) processing input data loads for instances and tasks of the programs and ii) contractual capacity entitlements of the programs.

An aspect of the invention provides methods and systems for intelligent, destination task defined prioritization of inter-task communications (ITC) for a computer program, for architectural ITC performance isolation among a set of programs executing concurrently on a dynamically shared data processing platform, as well as for prioritizing instances of the program tasks for execution at least in part based on which of the instances have available to them their input data, including ITC data, enabling any given one of such instances to execute at the given time.

An aspect of the invention provides a system for prioritizing instances of a software program for execution. Such a system comprises: 1) a subsystem for determining which of the instances are ready to execute on an array of processing cores, at least in part based on whether a given one of the instances has available to it input data to process, and 2) a subsystem for assigning a subset of the instances for execution on the array of cores based at least in part on the determining. Various embodiments of that system include further features such as features whereby a) the input data is from a data source such that the given instance has assigned a high priority for purposes of receiving data; b) the input data is such data that it enables the given program instance to execute; c) the subset includes cases of none, some as well as all of the instances of said program; d) the instance is: a process, a job, a task, a thread, a method, a function, a procedure or an instance any of the foregoing, or an independent copy of the given program; and/or e) the system is implemented by hardware logic that is able to operate without software involvement.

An aspect of the invention provides a hardware logic implemented method for prioritizing instances of a software program for execution, with such a method involving: classifying instances of the program into the following classes, listed in the order from higher to lower priority for execution, i.e., in their reducing execution priority order: (I) instances indicated as having high priority input data for processing, and (II) any other instances. Various embodiments of that method include further steps and features such as features whereby a) the other instances are further classified into the following sub-classes, listed in their reducing execution priority order: (i) instances indicated as able to execute presently without the high priority input data, and (ii) any remaining instances; b) the high priority input data is data that is from a source where its destination instance, of said program, is expecting high priority input data; c) a given instance of the program comprises tasks, with one of said tasks referred to as a destination task and others as source tasks of the given instance, and for the given instance, a unit of the input data is considered high priority if it is from such one of the source tasks that the destination task has assigned a high priority for inter-task communications to it; d) for any given one of the instances, a step of computing a number of its non-empty source task specific buffers among its input data buffers such that belong to source tasks of the given instance indicated at the time as high priority source tasks for communications to the destination task of the given instance, with this number referred to as an H number for its instance, and wherein, within the class I), the instances are prioritized for execution at least in part according to magnitudes of their H numbers, in descending order such that an instance with a greater H number is prioritized before an instance with lower H number; e) in case of two or more of the instances tied for the greatest H number, such tied instances are prioritized at least in part according to their respective total numbers of non-empty input data buffers, and/or f) at least one of the instances is either a process, a job, a task, a thread, a method, a function, a procedure, or an instance any of the foregoing, or an independent copy of the given program.

An aspect of the invention provides a system for processing a set of computer programs instances, with inter-task communications (ITC) performance isolation among the set of program instances. Such a system comprises: 1) a number of processing stages; and 2) a group of multiplexers connecting ITC data to a given stage among the processing stages, wherein a multiplexer among said group is specific to one given program instance among said set. The system hosts each task of the given program instance at different one of the processing stages, and supports copies of same task software code being located at more than one of the processing stages in parallel. Various embodiments of this system include further features such as a) a feature whereby at least one of processing stages comprises multiple processing cores such as CPU execution units, with, for any of the cores, at any given time, one of the program instances assigned for execution; b) a set of source task specific buffers for buffering data destined for a task of the given program instance located at the given stage, referred to as a destination task, and hardware logic for forming a hardware signal indicating whether sending ITC is presently permitted to a given buffer among the source task specific buffers, with such forming based at least in part on a fill level of the given buffer, and with such a signal being connected to a source task for which the given buffer is specific to; c) a feature providing, for the destination task, a set of source task specific buffers, wherein a given buffer is specific to one of the other tasks of the program instance for buffering ITC from said other task to the destination task; d) feature wherein the destination task provides ITC prioritization information for other tasks of the program instance located at their respective ones of the stages; d) a feature whereby the ITC prioritization information is provided by the destination task via a set of one or more hardware registers, with each register of the set specific to one of the other tasks of the program instance, and with each register configured to store a value specifying a prioritization level of the task that it is specific to, for purposes of ITC communications to the destination task; e) an arbitrator controlling from which source task of the program instance the multiplexer specific to that program instance will read its next ITC data unit for the destination task; and/or f) a feature whereby the arbitrator prioritizes source tasks of the program instance for selection by the multiplexer to read its next ITC data unit based at least in part on at least one of: (i) source task specific ITC prioritization information provided by the destination task, and (ii) source task specific availability information of ITC data for the destination task from the other tasks of the program instance.

Accordingly, aspects of the invention involve application-program instance specific hardware logic resources for secure and reliable ITC among tasks of application program instances hosted at processing stages of a multi-stage parallel processing system. Rather than seeking to inter-connect the individual processing stages or cores of the multi-stage manycore processing system as such, the invented mechanisms efficiently inter-connect the tasks of any given application program instance using the per application program instance specific inter-processing stage ITC hardware logic resources. Due to the ITC being handled with such application program instance specific hardware logic resources, the ITC performance experience by one application instance does not depend on the ITC resource usage (e.g. data volume and inter-task communications intensiveness) of the other applications sharing the given data processing system per the invention. This results in effective inter-application isolation for ITC in a multi-stage parallel processing system shared dynamically among multiple application programs.

An aspect of the invention provides systems and methods for scheduling instances of software programs for execution based at least in part on (1) availability of input data of differing priorities for any given one of the instances and/or (2) availability, on their fast-access memories, of memory contents needed by any given one of the instances to execute.

An aspect of the invention provides systems and methods for optimally allocating and assigning input port capacity to a data processing systems among data streams of multiple software programs based at least in part on input data load levels and contractual capacity entitlements of the programs.

An aspect of the invention provides systems and methods for resolution of resource access contentions, for resources including computing, storage and communication resources such as memories, queues, ports or processors. Such methods enable multiple potential user systems for a shared resource, in a coordinated and fair manner, to avoid conflicting resource access decisions, even while multiple user systems are deciding on access to set of shared resources concurrently, including at the same clock cycle.

An aspect of the invention provides systems and methods for load balancing, whereby the load balancer is configured to forward, by its first layer, any packets without destination instance within its destination application specified (referred to as no-instance-specified packets or NIS packets for short) it receives from its network input to such one of the processing systems in the local load balancing group that presently has the highest score for accepting NIS packets for the destination app of the given NIS packet. The load balancers further have destination processing system (i.e. for each given application, instance group) specific sub-modules, which, for NIS packets forwarded to them by the first layer balancing logic, specify a destination instance among the available, presently inactive instance resources of the destination app of a given NIS packet to which to forward the given NIS packet. In at least some embodiments of the invention, the score for accepting NIS packets for a destination processing system among the load balancing group is based at least in part on the amount of presently inactive instance resources at the given processing system for the destination application of a given NIS packet.

DETAILED DESCRIPTION

FIGS. and related descriptions in the following provide specifications for embodiments and aspects of hardware-logic based systems and methods for inter-task communications (ITC) with destination task defined source task prioritization, for input data availability based prioritization of instances of a given application task for execution on processing cores of a processing stage hosting the given task, for architecture-based application performance isolation for ITC in multi-stage manycore data processing system, as well as for load balancing of incoming processing data units among a group of such processing systems.

Figure 1:
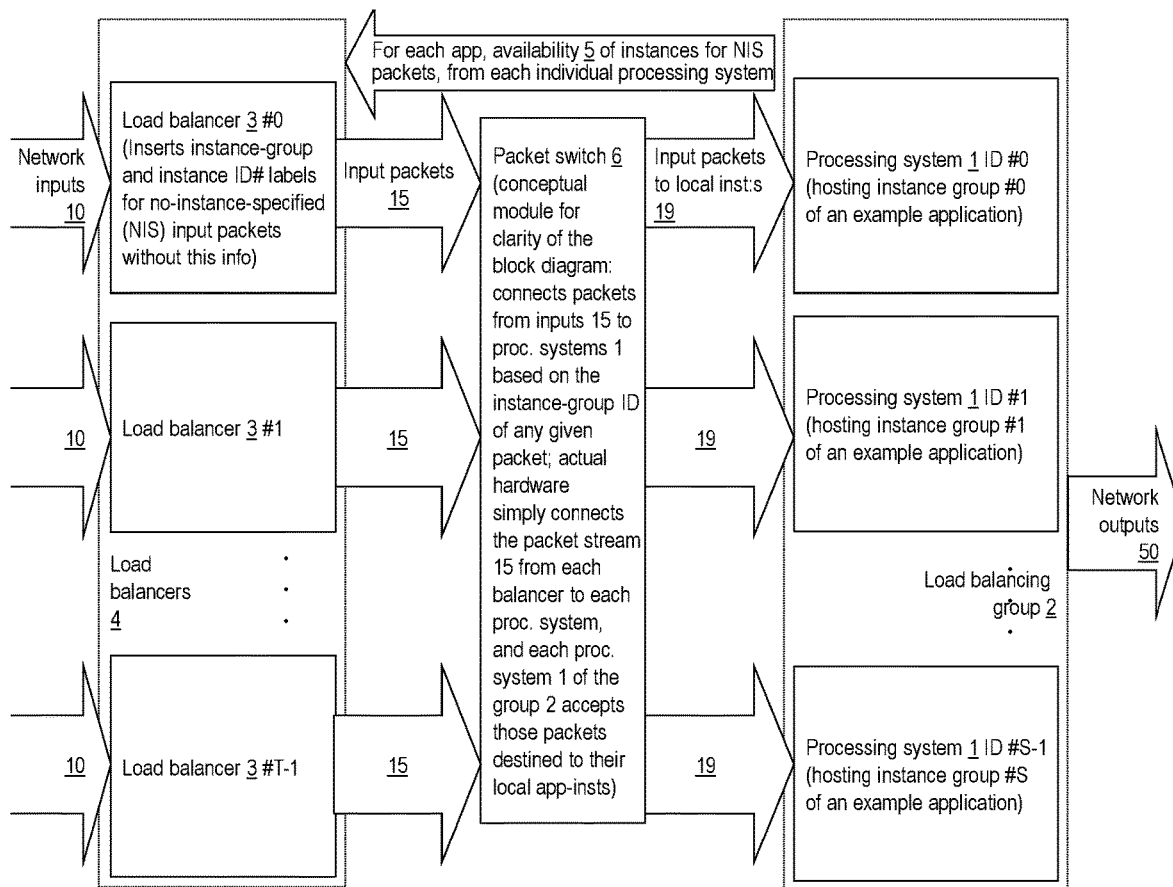
FIG. 1 shows, in accordance with an embodiment of the invention, a functional block diagram for a load balancing architecture for a bank of processor systems, such as those discussed in the following with reference to the remaining FIGS.
Figure 5:
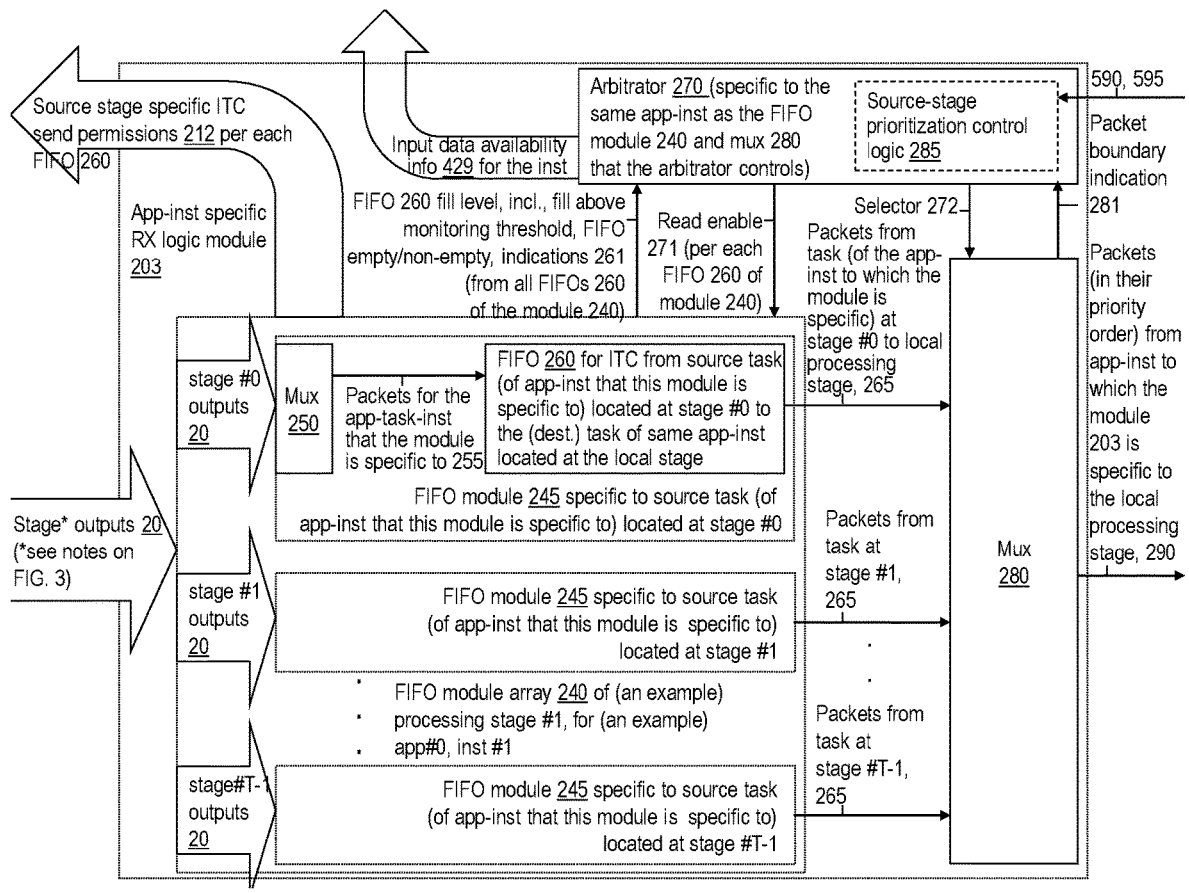
FIG. 5 shows, in accordance with an embodiment of the invention, a functional block diagram for an application program instance specific submodule of the application program specific submodule per FIG. 4.

The invention is described herein in further detail by illustrating the novel concepts in reference to the drawings. General symbols and notations used in the drawings:
Boxes indicate a functional module comprising digital hardware logic.
Arrows indicate a digital signal flow. A signal flow may comprise one or more parallel bit wires. The direction of an arrow indicates the direction of primary flow of information associated with it with regards to discussion of the system functionality herein, but does not preclude information flow also in the opposite direction.
A dotted line marks a border of a group of drawn elements that form a logical entity with internal hierarchy.
An arrow reaching to a border of a hierarchical module indicate connectivity of the associated information to/from all sub-modules of the hierarchical module.
Lines or arrows crossing in the drawings are decoupled unless otherwise marked.
For clarity of the drawings, generally present signals for typical digital logic operation, such as clock signals, or enable, address and data bit components of write or read access buses, are not shown in the drawings.
General notes regarding this specification (incl. text in the drawings):
For brevity: 'application (program)' is occasionally written in as 'app', 'instance' as 'inst' and 'application-task/instance' as 'app-task/inst' and so forth.
Terms software program, application program, application and program are used interchangeably in this specification, and each generally refers to any type of executable computer program.
In FIG. 5, and through the related discussions, the buffers 260 are considered to be First-in First-Out buffers (FIFO); however also other types than first-in first-out buffers can be used in various embodiments.
Illustrative embodiments and aspects of the invention are described in the following with references to the FIGS.
FIG. 1 presents the load balancing architecture for a row of processing systems per this description, comprising a set 4 of T load balancers 3 and a load balancing group 2 of S processing systems 1 (T and S are positive integers). Per this architecture, each of the balancers forward any no-instance-specific (NIS) packets (i.e. packets without a specific instance of their destination applications identified) arriving to them via their network inputs to one of the processing systems of the group, based on the NIS packet forwarding preference scores (for the destination app of the given NIS packet) of the individual processing systems of the load balancing group 2.

The load balancing per FIG. 1 for a bank 2 of the processing systems operates as follows:

The processing systems 1 count, for each of the application programs (apps) hosted on them:
a number X of their presently inactive instance resources, i.e., the number of additional parallel instances of the given app at the given processing system that could be activated at the time; and
from the above number, the portion Y (if any) of the additional activatable instances within the Core Entitlement (CE) level of the given app, wherein the CE is a number of processing cores at (any one of) the processing stages of the given processing system up to which the app in question is assured to get its requests for processing cores (to be assigned for its active instances) met;

the difference W=X−Y. The quantities X and/or W and Y, per each of the apps hosted on the load balancing group 2, are signaled 5 from each processing system 1 to the load balancers 4.

In addition, load balancing logic 4 computes the collective sum Z of the Y numbers across all the apps (with this across-apps-sum Z naturally being the same for all apps on a given processing system).

From the above numbers, for each app, the load balancer module 4 counts a no-instance-specified (NIS) packet forwarding preference score (NIS score) for each processing system in the given load balancing group with a formula of: A*Y+B*W+C*Z, where A, B and C are software programmable, defaulting to e.g. A=4, B=1 and C=2.

In forming the NIS scores for a given app (by formula per above), a given instance of the app under study is deemed available for NIS packets at times that the app instance software has set an associated device register bit (specific to that app-inst) to an active value, and unavailable otherwise. The multiplexing (muxing) mechanism used to connect the app-instance software, from whichever core at its host manycore processor it may be executing at any given time, to its app-instance specific memory, is used also for connecting the app-instance software to its NIS-availability control device register.

The app-instance NIS availability control register of a given app-instance is reset (when the app-instance software otherwise would still keep its NIS availability control register at its active stage) also automatically by processing stage RX logic hardware whenever there is data at the input buffer for the given app-instance.

Each of the processing systems in the given load balancing group signals their NIS scores for each app hosted on the load balancing group to each of the load balancers 4 in front of the row 2 of processing systems. Also, the processing systems 1 provide to the load balancers app specific vectors (as part of info flows 9) indicating which of their local instance resources of the given app are available for receiving NIS packets (i.e. packets with no destination instance specified).

Data packets from the network inputs 10 to the load balancing group include bits indicating whether any given packet is a NIS packet such that has its destination app but not any particular instance of the app specified. The load balancer 3 forwards any NIS packet it receives from its network input 10 to the processing system 1 in the local load balancing group 2 with the highest NIS score for the destination app of the given NIS packet. (In case of ties among the processing systems for the NIS score for the given destination app, the logic forwards the packet to the processing system among such tied systems based on their ID#, e.g. to the system with lowest ID#.) The forwarding of a NIS packet to a particular processing system 1 (in the load balancing group 2 of such systems) is done by this first layer of load balancing logic by forming packet write enable vectors where each given bit is a packet write enable bit specific to the processing system within the given load balancing group of the same system index # as the given bit in its write enable bit vector. For example, the processing system ID#2 from a load balancing group of processing systems of ID#0 through ID#4 takes the bit at index 2 of the packet write enable vectors from the load balancers of the given group. In a straightforward scheme, the processing system #K within a given load balancing group hosts the instance group #K of each of the apps hosted by this group of the processing systems (where K=0,1, . . . , max nr of processing systems in the load balancing group less 1).

The load balancers 3 further have destination processing system 1 (i.e. for each given app, instance group) specific submodules, which, for NIS packets forwarded to them by the first layer balancing logic (per above), specify a destination instance among the available (presently inactive) instance resources of the destination app of a given NIS packet to which to forward the given NIS packet. In an straightforward scheme, for each given NIS packet forwarded to it, this instance group specific load balancing submodule selects, from the at-the-time available instances of the of the destination app, within the instance group that the given submodule is specific to, the resource with lowest ID#.

For other (not NIS) packets, the load balancer logic 3 simply forwards a given (non NIS) packet to the processing system 1 in the load balancing group 2 that hosts, for the destination app of the given packet, the instance group of the identified destination instance of the packet.

According to the forwarding decision per above bullet points, the (conceptual, actually distributed per the destination processing systems) packet switch module 6 filters packets from the output buses 15 of the load balancers 3 to input buses 19 of the destination processing systems, so that each given processing system 1 in the load balancing group 2 receives as active packet transmissions (marked e.g. by write by write enable signaling) on its input bus 19, from the packets arriving from the load balancer inputs 10, those packets that were indicated as destined to the given system 1 at entry to the load balancers, as well as the NIS packets that the load balancers of the set 4 forwarded to that given system 1.

Note also that the network inputs 10 to the load balancers, as well as all the bold data path arrows in the FIGS., may comprise a number of parallel of (e.g. 10 Gbps) ports.

The load balancing logic implements coordination among port modules of the same balancer, so that any given NIS packet is forwarded, according to the above destination instance selection logic, to one of such app-instances that is not, at the time of the forwarding decision, already being forwarded a packet (incl. forwarding decisions made at the same clock cycle) by port modules with higher preference rank (e.g. based on lower port #) of the same balancer. Note that each processing system supports receiving packets destined for the same app-instance concurrently from different load balancers (as explained below).

The load balancers 3 support, per each app-inst, a dedicated input buffer per each of the external input ports (within the buses 10) to the load balancing group. The system thus supports multiple packets being received (both via the same load balancer module 3, as well as across the different load balancer modules per FIG. 1) simultaneously for the same app-instances via multiple external input ports. From the load balancer input buffers, data packets are muxed to the processing systems 1 of the load balancing group so that the entry stage processor of each of the multi-stage systems (see FIG. 2) in such group receives data from the load balancers similarly as the non-entry-stage processors receive data from the other processing stages of the given multi-stage processing system—i.e., in a manner that the entry stage (like the other stages) will get data per each of its app-instances at most via one of its input ports per a (virtual) source stage at any given time; the load balancer modules of the given load balancing group (FIG. 1) appear thus as virtual source processing stages to entry stage of the multi-stage processing systems of such load balancing group. The aforesaid functionality is achieved by logic at module 4 as detailed below:

To eliminate packet drops in cases where packets directed to same app-inst arrive in a time-overlapping manner through multiple input ports (within the buses 10) of same balancer 3, destination processing system 1 specific submodules at modules 3 buffer input data 15 destined for the given processing system 1 at app-inst specific buffers, and assign the processing system 1 input ports (within the bus 19 connecting to their associated processing system 1) among the app-insts so that each app-inst is assigned at any given time at most one input port per a load balancer 3. (Note that inputs to a processing system 1 from different load balancers 3 are handled by the entry stage (FIG. 2) the same way as the other processing stages 300 handle inputs from different source stages, as detailed in connection to FIG. 5—in a manner that supports concurrent reception of packets to the same destination app-inst from multiple source stages.) More specifically, the port capacity 19 for transfer of data from load balancers 4 to the given processing system 1 entry-stage buffers gets assigned using the same algorithm as is used for assignment of processing cores between the app-instances at the processing stages (FIG. 7), i.e., in a realtime input data load adaptive manner, while honoring the contractual capacity entitlements and fairness among the apps for actually materialized demands. This algorithm, which allocates at most one of the cores per each of the app-insts for the core allocation periods following each of its runs— and similarly assigns at most one of the ports at buses 19 to the given processing system 1 per each of the app-inst specific buffers queuing data destined for that processing system from any given source load balancer 3—is specified in detail in [1], Appendix A, Ch. 5.2.3. By this logic, the entry stage of the processing system (FIG. 2) will get its input data same way as the other stages, and there thus is no need to prepare for cases of multiple packets to same app-inst arriving simultaneously at any destination processing stage from any of its source stages or load balancers. This logic also ensures that any app with moderate input bandwidth consumption will gets its contractually entitled share of the processing system input bandwidth (i.e. the logic protects moderate bandwidth apps from more input data intensive neighbors).

Note that since packet transfer within a load balancing group (incl. within the sub-modules of the processing systems) is between app-instance specific buffers, with all the overhead bits (incl. destination app-instance ID) transferred and buffered as parallel wires besides the data, core allocation period (CAP) boundaries will not break the packets while being transferred from the load balancer buffers to a given processing system 1 or between the processing stages of a given multi-stage system 1.

The mechanisms per above three bullet points are designed to eliminate all packet drops in the system such that are avoidable by system design, i.e., for reasons other than app-instance specific buffer overflows caused be systemic mismatches between input data loads to a given app-inst and the capacity entitlement level subscribed to by the given app.

Figure 2:
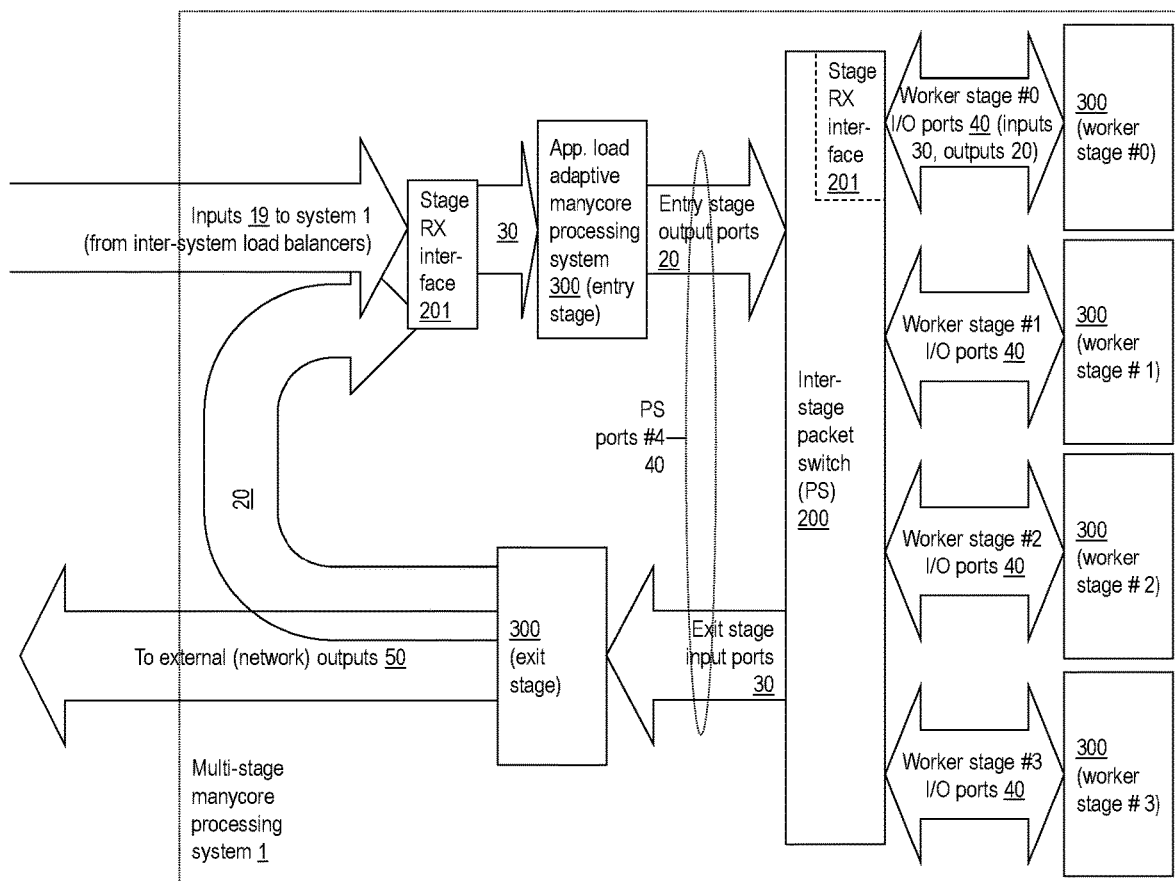
FIG. 2 shows, in accordance with an embodiment of the invention, a functional block diagram for a multi-stage manycore processing system shared dynamically among a set of software program instances, with the system providing capabilities for optimally scheduling inter-task communications (ITC) units between various tasks of any one of the program instances, as well as scheduling and placing instances of a given program task for execution on the processing stages of the system, at least in part based on which of the instances have available for them the input data, e.g. ITC data, needed by them to execute.

FIG. 2 provides, according to an embodiment of the invention, a functional block diagram for a multistage manycore processor system 1 shared dynamically multiple concurrent application programs (apps), with hardware logic implemented capabilities for scheduling tasks of application program instances and prioritizing inter-task communications (ITC) among tasks of a given app instance, based at least in part on, for any given app-inst, at a given time, which tasks are expecting input data from which other tasks and which tasks are ready to execute on cores of the multi-stage manycore processing system, with the ready-to-execute status of a given task being determined at least in part based on whether the given task has available to it the input data from other tasks or system 1 inputs 19 so as to enable it to execute at the given time, including producing its processing outputs, such as ITC communications 20 to other tasks or program processing results etc. communications for external parties via external outputs 50. Operation and internal structure and elements of FIG. 2, other than for the aspects described herein, is, according to at least some embodiments of the invention, per [1], which the reader may review before this specification for context and background material.

In the architecture per FIG. 2, the multi-stage manycore processor system 1 is shared dynamically among tasks of multiple application programs (apps) and instances (insts) thereof, with, for each of the apps, each task located at one of the (manycore processor) based processing stages 300. Note however that, for any given app-inst, copies of same task software (i.e. copies of same software code) can be located at more than one of the processing stages 300 of a given system 1; thus the architecture per FIG. 2, with its any-to-any ITC connectivity between the stages 300, supports organizing tasks of a program flexibly for any desirable mixes or matches of pipelined and/or parallelized processing.

General operation of the application load adaptive, multi-stage parallel data processing system per FIG. 2, focusing on the main inputs to outputs data flows, is as follows: The system provides data processing services to be used by external parties (e.g. by clients of the programs hosted on the system) over networks. The system 1 receives data units (e.g. messages, requests, data packets or streams to be processed) from its users through its inputs 19, and transmits the processing results to the relevant parties through its network outputs 50. Naturally the network ports of the system of FIG. 2 can be used also for connecting with other (intermediate) resources and services (e.g. storage, databases etc.) as desired for the system to produce the requested processing results to the relevant external parties.

The application program tasks executing on the entry stage manycore processor are typically of 'master' type for parallelized/pipelined applications, i.e., they manage and distribute the processing workloads for 'worker' type tasks running (in pipelined and/or parallel manner) on the worker stage manycore processing systems (note that the processor system hardware is similar across all instances of the processing stages 300). The instances of master tasks typically do preliminary processing (e.g. message/request classification, data organization) and workflow management based on given input data units (packets), and then typically involve appropriate worker tasks at their worker stage processors to perform the data processing called for by the given input packet, potentially in the context of and in connection with other related input packets and/or other data elements (e.g. in memory or storage resources accessible by the system)

referred to by such packets. (The processors have access to system memories through interfaces also additional to the IO ports shown in FIG. 2, e.g. as described in [1], Appendix A, Ch. 5.4). Accordingly, the master tasks typically pass on the received data units (using direct connection techniques to allow most of the data volumes being transferred to bypass the actual processor cores) through the (conceptual) inter-stage packet-switch (PS) to the worker stage processors, with the destination application-task instance (and thereby, the destination worker stage) identified for each data unit as described in the following.

To provide isolation among the different applications configured to run on the processors of the system, by default the hardware controller of each processor 300, rather than any application software (executing on a given processor), inserts the application ID# bits for the data packets passed to the PS 200. That way, the tasks of any given application running on the processing stages in a system can trust that the packets they receive from the PS are from its own application. Note that the controller determines, and therefore knows, the application ID# that each given core within its processor is assigned to at any given time, via the application-instance to core mapping info that the controller produces. Therefore the controller is able to insert the presently-assigned app ID# bits for the inter-task data units being sent from the cores of its processing stage over the core-specific output ports to the PS.

While the processing of any given application (server program) at a system per FIG. 2 is normally parallelized and/or pipelined, and involves multiple tasks (many of which tasks and instances thereof can execute concurrently on the manycore arrays of the processing stages 300), the system enables external parties to communicate with any such application hosted on the system without knowledge about any specifics (incl. existence, status, location) of their internal tasks or instances. As such, the incoming data units to the system are expected to identify just their destination application, and when applicable, the application instance. Moreover, the system enables external parties to communicate with any given application hosted on a system through any of the network input ports 10 of any of the load balancers 3, without such external parties knowing whether or at which cores 520 (FIG. 7) or processing stages 300 any instance of the given application task (app-task) may be executing at any time.

Notably, the architecture enables the aforesaid flexibility and efficiency through its hardware logic functionality, so that no system or application software running on the system needs to either keep track of whether or where any of the instances of any of the app-tasks may be executing at any given time, or which port any given inter-task or external communication may have used. Thus the system, while providing a highly dynamic, application workload adaptive usage of the system processing and communications resources, allows the software running on and/or remotely using the system to be designed with a straightforward, abstracted view of the system: the software (both remote and local programs) can assume that all the applications, and all their tasks and instances, hosted on the given system are always executing on their virtual dedicated processor cores within the system. Also, where useful, said virtual dedicated processors can also be considered by software to be time-share slices on a single (unrealistically high speed) processor.

The presented architecture thereby enables achieving, at the same time, both the vital application software development productivity (simple, virtual static view of the actually highly dynamic processing hardware) together with high program runtime performance (scalable concurrent program execution with minimized overhead) and resource efficiency (adaptively optimized resource allocation) benefits. Techniques enabling such benefits of the architecture are described in the following through more detailed technical description of the system 1 and its subsystems.

The any-to-any connectivity among the app-tasks of all the processing stages 300 provided by the PS 200 enables organizing the worker tasks (located at the array of worker stage processors) flexibly to suit the individual demands (e.g. task inter-dependencies) of any given application program on the system: the worker tasks can be arranged to conduct the work flow for the given application using any desired combinations of parallel and pipelined processing. E.g., it is possible to have the same task of a given application located on any number of the worker stages in the architecture per FIG. 2, to provide a desired number of parallel copies of a given task per an individual application instance, i.e. to support also data-parallelism, along with task concurrency.

The set of applications configured to run on the system can have their tasks identified by (intra-app) IDs according to their descending order of relative (time-averaged) workload levels. Under such (intra-app) task ID assignment principle, the sum of the intra-application task IDs, each representing the workload ranking of its tasks within its application, of the app-tasks hosted at any given processing system is equalized by appropriately configuring the tasks of differing ID#s, i.e. of differing workload levels, across the applications for each processing system, to achieve optimal overall load balancing. For instance, in case of T=4 worker stages, if the system is shared among M=4 applications and each of that set of applications has four worker tasks, for each application of that set, the busiest task (i.e. the worker task most often called for or otherwise causing the heaviest processing load among tasks of the app) is given task ID#0, the second busiest task ID#1, the third busiest ID#2, and the fourth ID#3. To balance the processing loads across the applications among the worker stages of the system, the worker stage #t gets task ID #t+m (rolling over at 3 to 0) of the application ID #m (t=0,1, . . . T−1; m=0,1, . . . M−1) (note that the master task ID#4 of each app is located at the entry/exit stages). In this example scenario of four application streams, four worker tasks per app as well as four worker stages, the above scheme causes the task IDs of the set of apps to be placed at the processing stages per Table 1 below:

TABLE 1

| App ID# m (to right) Processing worker stage# t (below) | 0 | 1 | 2 | 3 |
|---|---|---|---|---|
| 0 | 0 | 1 | 2 | 3 |
| 1 | 1 | 2 | 3 | 0 |
| 2 | 2 | 3 | 0 | 1 |
| 3 | 3 | 0 | 1 | 2 |

As seen in the example of Table 1, the sum of the task ID#s (with each task ID# representing the workload ranking of its task within its app) is the same for any row i.e. for each worker stage. This load balancing scheme can be straightforwardly applied for differing numbers of processing stages/tasks and applications, so that the overall task processing load is to be, as much as possible, equal across all worker-stage processors of the system. Advantages of such schemes include achieving optimal utilization efficiency of the processing resources and eliminating or at least minimizing the possibility and effects of any of the worker-stage processors forming system-wide performance bottlenecks.

A non-exclusive alternative task to stage placement principle targets grouping tasks from the apps in order to minimize any variety among the processing core types demanded by the set of app-tasks placed on any given individual processing stage; that way, if all app-tasks placed on a given processing stage optimally run on the same processing core type, there is no need for reconfiguring the core slots of the manycore array at the given stage regardless which of the locally hosted app-tasks get assigned to which of its core slots (see [1], Appendix A, Ch. 5.5 for task type adaptive core slot reconfiguration, which may be used when the app-task located on the given processing stage demand different execution core types).

Figure 3:
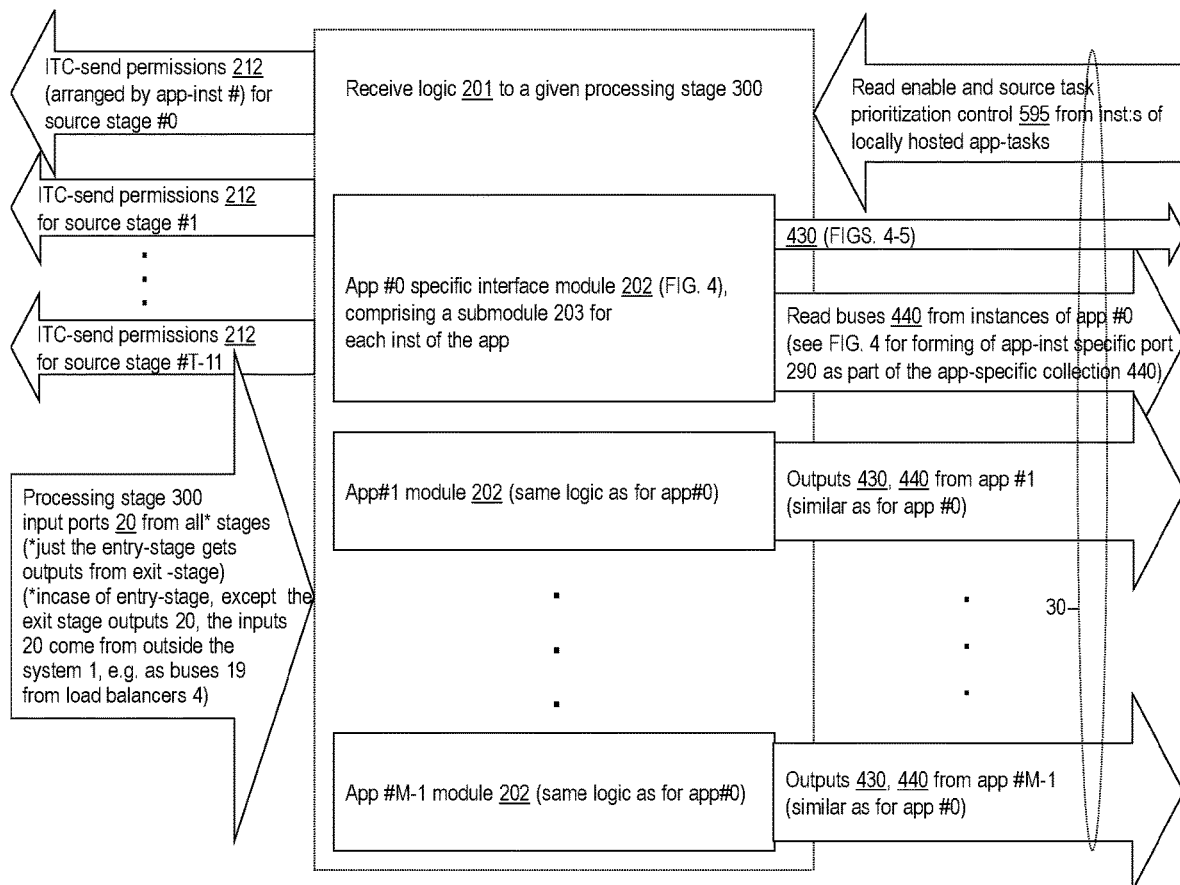
FIG. 3 shows, in accordance with an embodiment of the invention, a functional block diagram for a receive (RX) logic module of any of the processing stages of the multi-stage manycore processor system per FIG. 2.
Figure 4:
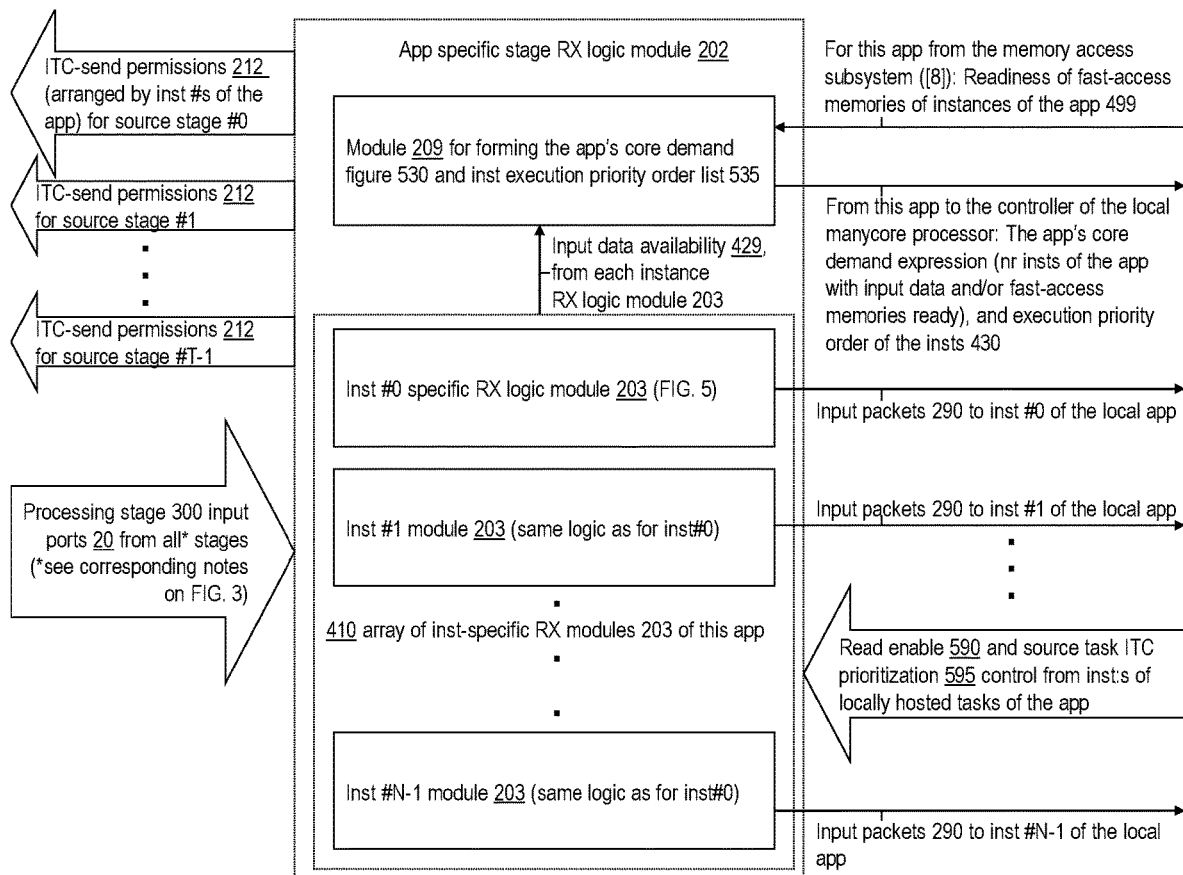
FIG. 4 shows, in accordance with an embodiment of the invention, a functional block diagram for an application program specific submodule of the processing stage RX logic module per FIG. 3.

FIGS. 3-5 present the processing stage, app, app-instance level microarchitectures for the processing stage receive (RX) logic modules 201 (which collectively accomplish the functionality of the conceptual inter-stage packet-switch (PS) module of FIG. 2).

For a system of FIG. 2, note that the functionality of the conceptual inter-stage PS 200 is actually realized by instantiating the logic per FIG. 3 (and its submodules) as the RX logic of each manycore processing system 300 (referred to as a stage) in the multi-stage architecture; there is no need for other logic to the PS. Accordingly, in the hardware implementation, the stage RX logic 201 per FIG. 3-5 is part of the processing stage 300 that it interfaces to; i.e., in an actual hardware implementation, there is no PS module as its functionality is distributed to the individual processing stages.

Besides the division of the app-specific submodules 202 of the stage RX logic per FIG. 3 further to the array 410 of app-instance specific sub-modules 203, FIG. 4 shows how the app-specific RX logic forms, for purposes of optimally assigning the processing cores of the local manycore processor among insts of the apps sharing the system, the following info for the given app:

Formation of a request for a number of processing cores (Core Demand Figure, CDF) at the local processing stage by the given app. The logic forms the CDF for the app based on the number of instances of the app that presently have (1) input data at their input buffers (with those buffers located at the instance specific stage RX logic submodules 203 per FIG. 5) and (2) their on-chip fast-access memory contents ready for the given instance to execute without access to the slower-access off-chip memories. In FIGS. 4, (1) and (2) per above are signaled to the app-specific RX logic module 209 via the info flows 429 and 499 from the app-inst specific modules 203 (FIG. 5) and 800 (FIG. 7), respectively, per each of the insts of the app under study.

The priority order of instances of the app for purposes of selecting such instances for execution on the cores of the local manycore processor.

The info per the above two bullet points are sent from the RX logic 202 of each app via the info flow 430 to the controller 540 (FIG. 7) of the local manycore processor 500, for the controller to assign optimal sets of the app-insts for execution on the cores 520 of the processor 500.

The app-instance specific RX logic per FIG. 5 performs multiplexing 280 ITC packets from the source stage i.e. source task (of a given app-inst) specific First-in First-Out buffers (FIFOs) 260 to the local manycore processor via the input port 290 of that processor dedicated to the given app instance.

Note that when considering the case of RX logic of the entry-stage processing system of the multi-stage architecture per FIG. 2, note that in FIG. 5 and associated descriptions the notion of source stage/task naturally is replaced by the source load balancer, except in case of the ITC 20 from the exit stage to entry-stage, in which case the data source naturally is the exit stage processing system. However, the same actual hardware logic is instantiated for each occurrence of the processing stages 300 (incl. for the RX logic 201 of each stage) in this multi-stage architecture, and thus the operation of the stage RX logic can be fully explained by (as is done in the following) by assuming that the processing stage under study is instantiated as a worker or exit stage processing system, such that receives its input data from the other processing stages of the given multi-stage manycore processor, rather than from the load balancers of the given load balancing group, as in the case of the entry-stage processors; the load balancers appear to the entry-stage as virtual processing stages. Accordingly, when the RX logic of the entry stage manycore processor is considered, the references to 'source stage' are to be understood as actually referring to load balancers, and the references to ITC mean input data 19 to the multi-stage manycore processor system—except in case of the ITC 20 from the exit stage, as detailed above and as illustrated in FIG. 2. With this caveat, the description of the stage RX logic herein is written considering the operating context of worker and exit stage processors (with the same hardware logic being used also for the entry-stage).

Before the actual multiplexer, the app-instance specific RX logic per FIG. 5 has a FIFO module 245 per each of the source stages. The source-stage specific FIFO module comprises:

The actual FIFO 260 for queuing packets from its associated source stage that are destined to the local task of the app-instance that the given module per FIG. 5 is specific to.

A write-side multiplexer 250 (to the above referred FIFO) that (1) takes as its data inputs 20 the processing core specific data outputs 210 (see FIG. 7) from the processing stage that the given source-stage specific FIFO module is specific to, (2) monitors (via the data input overhead bits identifying the app-instance and destination task within it for any given packet transmission) from which one of its input ports 210 (within the bus 20) it may at any given time be receiving a packet destined to the local task of the app-instance that the app-instance specific RX logic under study is specific to, with such an input referred to as the selected input, and (3) connects 255 to its FIFO queue 260 the packet transmission from the present selected input. Note that at any of the processing stages, at any given time, at most one processing core will be assigned for any given app instance. Thus any of the source stage specific FIFO modules 245 of the app-instance RX logic per FIG. 5 can, at any given time, receive data destined to the local task of the app-instance that the given app-instance RX logic module is specific to from at most one of the (processing core specific) data inputs of the write-side multiplexer (mux) 250 of the given FIFO module. Thus there is no need for separate FIFOs per each of the (e.g. 16 core specific) ports of the data inputs 20 at these source stage specific FIFO modules, and instead, just one common FIFO suffices per each given source stage specific buffering module 245.

For clarity, the "local" task refers to the task of the app-instance that is located at the processing stage 300 that the RX logic under study interfaces to, with that processing stage or processor being referred to as the local processing stage or processor. Please recall that per any given app, the individual tasks are located at separate processing stages. Note though that copies of the same task for a given app can be located at multiple processing stages in parallel. Note further that, at any of the processing stages, there can be multiple parallel instances of any given app executing concurrently, as well as that copies of the task can be located in parallel at multiple processing stages of the multi-stage architecture, allowing for processing speed via parallel execution at application as well as task levels, besides between the apps.

The app-instance RX module 203 per FIG. 5 further provides arbitrating logic 270 to decide, at multiplexing packet boundaries 281, from which of the source stage FIFO modules 245 to mux 280 out the next packet to the local manycore processor via the processor data input port 290 specific to the app-instance under study. This muxing process operates as follows:

Each given app-instance software provides a logic vector 595 to the arbitrating logic 270 of its associated app-instance RX module 203 such that has a priority indicator bit within it per each of its individual source stage specific FIFO modules 245: while a bit of such a vector relating to a particular source stage is at its active state (e.g. logic '1'), ITC from the source stage in question to the local task of the app-instance will be considered to be high priority, and otherwise normal priority, by the arbitrator logic in selecting the source stage specific FIFO from where to read the next ITC packet to the local (destination) task of the studied app-instance.

The arbitrator selects the source stage specific FIFO 260 (within the array 240 of the local app-instance RX module 203) for reading 265, 290 the next packet per the following source priority ranking algorithm:

The source priority ranking logic maintains three logic vectors as follows:
1) A bit vector wherein each given bit indicates whether a source stage of the same index as the given bit is both assigned by the local (ITC destination) task of the app-instance under study a high priority for ITC to it and has its FIFO 260 fill level above a configured monitoring threshold;
2) A bit vector wherein each given bit indicates whether a source stage of the same index as the given bit is both assigned a high priority for ITC (to the task of the studied app-instance located at the local processing stage) and has its FIFO non-empty;
3) A bit vector wherein each given bit indicates whether a source stage of the same index as the given bit has its FIFO fill level above the monitoring threshold; and
4) A bit vector wherein each given bit indicates whether a source stage of the same index as the given bit has data available for reading.

The FIFO 260 fill level and data-availability is signaled in FIG. 5 via info flow 261 per each of the source-stage specific FIFO modules 245 of the app-inst specific array 240 to the arbitrator 270 of the app-inst RX module, for the arbitrator, together with the its source stage prioritization control logic 285, to select 272 the next packet to read from the optimal source-stage specific FIFO module 245 (as detailed below).

The arbitrator logic 270 also forms (by logic OR) an indicator bit for each of the above vectors 1) through 4) telling whether the vector associated with the given indicator has any bits in its active state. From these indicators, the algorithm searches the first vector, starting from vector 1) and proceeding toward vector 4), that has one or more active bits; the logic keeps searching until such a vector is detected.

From the detected highest priority ranking vector with active bit(s), the algorithm scans bits, starting from the index of the current start-source-stage (and after reaching the max bit index of the vector, continuing from bit index 0), until it finds a bit in an active state (logic '1'); the index of such found active bit is the index of the source stage from which the arbitrator controls its app-instance port mux 280 to read 265 its next ITC packet for the local task of the studied app-instance.

The arbitrator logic uses a revolving (incrementing by one at each run of the algorithm, and returning to 0 from the maximum index) starting source stage number as a starting stage in its search of the next source stage for reading an ITC packet.

When the arbitrator has the appropriate data source (from the array 240) thus selected for reading 265, 290 the next packet, the arbitrator 270 directs 272 the mux 280 to connect the appropriate source-stage specific signal 265 to its output 290, and accordingly activates, when enabled by the read-enable control 590 from the app-inst software, the read enable 271 signal for the FIFO 260 of the presently selected source-stage specific module 245.

Note that the ITC source task prioritization info 595 from the task software of app-instances to their RX logic modules 203 can change dynamically, as the processing state and demands of input data for a given app-instance task evolve over time, and the arbitrator modules 270 (FIG. 5) apply the current state of the source task prioritization info provided to them in selecting from which of the source stages to multiplex 280 out the next ITC packet over the output port 290 of the app-instance RX logic. In an embodiment, the local task of a given app-inst, when a need arises, writes 575, 595 the respective ITC prioritization levels for its source tasks (of the given app-inst) on its source-task specific ITC prioritization hardware registers, which are located at (or their info connected to) source-stage prioritization control logic submodule 285 of the arbitrator 270 of the RX module 203 of that given app-inst. Please see FIG. 7 for the muxing 580 of the input data read control info (incl. source prioritization) from the app-insts executing at the cores of the array to their associated RX modules 203.

In addition, the app-instance RX logic per FIG. 5 participates in the inter-stage ITC flow-control operation as follows:

Each of the source stage specific FIFO modules 245 of a given app-instance at the RX logic for a given processing stage maintains a signal 212 indicating whether the task (of the app instance under study) located at the source stage that the given FIFO 260 is specific to is presently permitted to send ITC to the local (destination) task of the app-instance under study: the logic denies the permit when the FIFO fill level is above a defined threshold, while it otherwise grants the permit.

As a result, any given (source) task, when assigned for execution at a core 520 (FIG. 7) at the processing stage where the given task is located, receives the ITC sending permission signals from each of the other (destination) tasks of its app-instance. Per FIG. 7, these ITC permissions are connected 213 to the processing cores of the (ITC source)

stages through multiplexers 600, which, according to the control 560 from the controller 540 at the given (ITC source) processing stage identifying the active app-instance for each execution core 520, connect 213 the incoming ITC permission signals 212 from the other stages of the given multi-stage system 1 to the cores 520 at that stage. For this purpose, the processing stage provides core specific muxes 600, each of which connects to its associated core the incoming ITC send permit signals from the 'remote' (destination) tasks of the app-instance assigned at the time to the given core, i.e., from the tasks of that app-instance located at the other stages of the given processing system. The (destination) task RX logic modules 203 activate the ITC permission signals for times that the source task for which the given permission signal is directed to is permitted to send further ITC data to that destination task of the given app-inst.

Each given processing stage receive and monitor ITC permit signal signals 212 from those of the processing stages that the given stage actually is able to send ITC data to; please see FIG. 2 for ITC connectivity among the processing stages in the herein studied embodiment of the presented architecture.

The ITC permit signal buses 212 will naturally be connected across the multi-stage system 1 between the app-instance specific modules 203 of the RX logic modules 202 of the ITC destination processing stages and the ITC source processing stages (noting that a given stage 300 will be both a source and destination for ITC as illustrated in FIG. 2), though the inter-stage connections of the ITC flow control signals are not shown in FIG. 2. The starting and ending points of the of the signals are shown, in FIG. 5 and FIG. 7 respectively, while the grouping of these ITC flow control signals according to which processing stage the given signal group is directed to, as well as forming of the stage specific signal groups according to the app-instance # that any given ITC flow control signal concerns, are illustrated also in FIGS. 3-4. In connecting these per app-instance ID# arranged, stage specific groups of signals (FIG. 3) to any of the processing stages 300 (FIG. 7), the principle is that, at arrival to the stage that a given set of such groups of signals is directed to, the signals from said groups are re-grouped to form, for each of the app-instances hosted on the system 1, a bit vector where a bit of a given index indicates whether the task of a given app-instance (that the given bit vector is specific to) hosted at this (source) stage under study is permitted at that time to send ITC data to its task located at the stage ID# of that given index. Thus, each given bit in these bit vectors informs whether the studied task of the given app-instance is permitted to send ITC to the task of that app-instance with task ID# equal to the index of the given bit. With the incoming ITC flow control signals thus organized to app-instance specific bit vectors, the above discussed core specific muxes 600 (FIG. 7) are able to connect to any given core 520 of the local manycore array the (task-ID-indexed) ITC flow control bit vector of the app-instance presently assigned for execution at the given core. By monitoring the destination stage (i.e. destination task) specific bits of the ITC permission bit vector thus connected to the present execution core of a task of the studied app-instance located at the ITC (source) processing stage under study (at times that the given app-instance actually is assigned for execution), that ITC source task will be able to know to which of the other tasks of its app-instance sending ITC is permitted at any given time.

Note that, notwithstanding the functional illustration in FIG. 5, in actual hardware implementation, the FIFO fill-above-threshold indications from the source stage specific FIFOs 260 of the app-instance specific submodules of the RX logic modules of the (ITC destination) processing stages of the present multi-stage system are wired directly, though as inverted, as the ITC send permission indication signals to the appropriate muxes 600 of the (ITC source) stages, without going through the arbitrator modules (of the app-instance RX logic modules at the ITC destination stages). Naturally, an ITC permission signal indicating that the destination FIFO for the given ITC flow has its fill level presently above the configured threshold is to be understood by the source task for that ITC flow as a denial of the ITC permission (until that signal would turn to indicate that the fill level of the destination FIFO is below the configured ITC permission activation threshold).

Each source task applies these ITC send permission signals from a given destination task of its app-instance at times that it is about to begin sending a new packet over its (assigned execution core specific) processing stage output port 210 to that given destination task. The ITC destination FIFO 260 monitoring threshold for allowing/disallowing further ITC data to be sent to the given destination task (from the source task that the given FIFO is specific to) is set to a level where the FIFO still has room for at least one ITC packet worth of data bytes, with the size of such ITC packets being configurable for a given system implementation, and the source tasks are to restrict the remaining length of their packet transmissions to destination tasks denying the ITC permissions according to such configured limits.

The app-level RX logic per FIG. 4 arranges the instances of its app for the instance execution priority list 535 (sent via info flow 430) according to their descending order of their priority scores computed for each instance based on their numbers 429 of source stage specific non-empty FIFOs 260 (FIG. 5) as follows. To describe the forming of priority scores, we first define (a non-negative integer) H as the number of non-empty FIFOs of the given instance whose associated source stage was assigned a high ITC priority (by the local task of the given app-instance hosted at the processing stage under study). We also define (a non-negative integer) L as the number of other (non-high ITC priority source task) non-empty FIFOs of the given instance. With H and L thus defined, the intra-app execution priority score P for a given instance specific module (of the present app under study) is formed with equations as follows, with different embodiments having differing coefficients for the factors H, L and the number of tasks for the app, T:

for H>0, P=T−1+2H+L; and for H=0, P=L.

The logic for prioritizing the instances of the given app for its execution priority list 535, via a continually repeating process, signals (via hardware wires dedicated for the purpose) to the controller 540 of the local manycore processor 500 (FIG. 7) this instance execution priority list using the following format:

The process periodically starts from priority order 0 (i.e. the app's instance with the greatest priority score P), and steps through the remaining priority orders 1 through the maximum supported number of instances for the given application (specifically, for its task located at the processing stage under study) less 1, producing one instance entry per each step on the list that is sent to the controller as such individual entries. Each entry of such a priority list comprises, as its core info, simply the instance ID# (as the priority order of any given instance is known from the number of clock cycles since the bit pulse marking the priority order 0 at the start of a new list). To simplify the logic, also the priority order (i.e. the number of clock cycles since the bit pulse marking the priority order 0) of any given entry on these lists is sent along with the instance ID#.

At the beginning of its core to app-instance assignment process, the controller 540 of the manycore processor uses the most recent set of complete priority order lists 535 received from the application RX modules 202 to determine which (highest priority) instances of each given app to assign for execution for the next core allocation period on that processor.

Per the foregoing, the ITC source prioritization, program instance execution prioritization and ITC flow control techniques provide effective program execution optimization capabilities for each of a set of individual programs configured to dynamically share a given data processing system 1 per this description, without any of the programs impacting or being impacted by in any manner the other programs of such set. Moreover, for ITC capabilities, also the individual instances (e.g. different user sessions) of a given program are fully independent from each other. The herein described techniques and architecture thus provide effective performance and runtime isolation between individual programs among groups of programs running on the dynamically shared parallel computing hardware.

Figure 6:
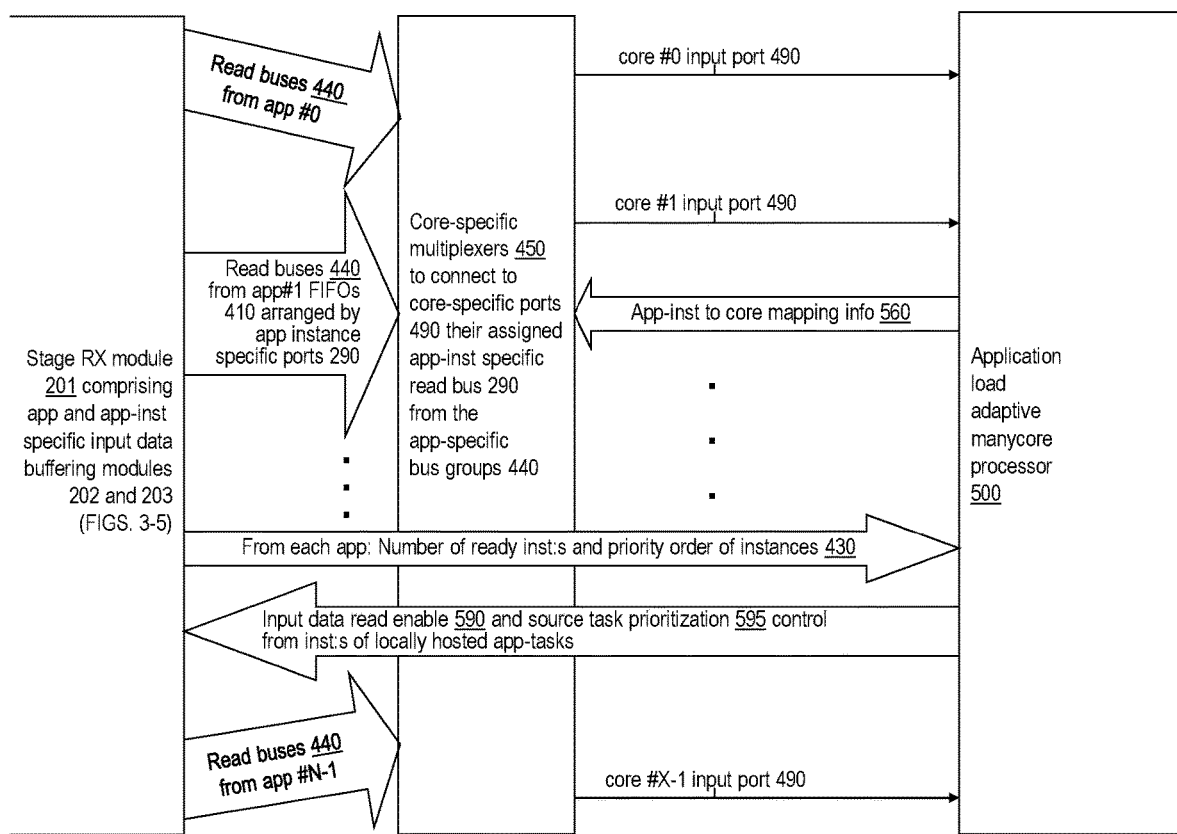
FIG. 6 shows, in accordance with an embodiment of the invention, a functional block diagram for logic resources within one of the processing stages of a system 1 per FIG. 2 for connecting ITC data from input buffers of the RX logic (per FIGS. 3-5) to the manycore processor of the local processing stage.
Figure 7:
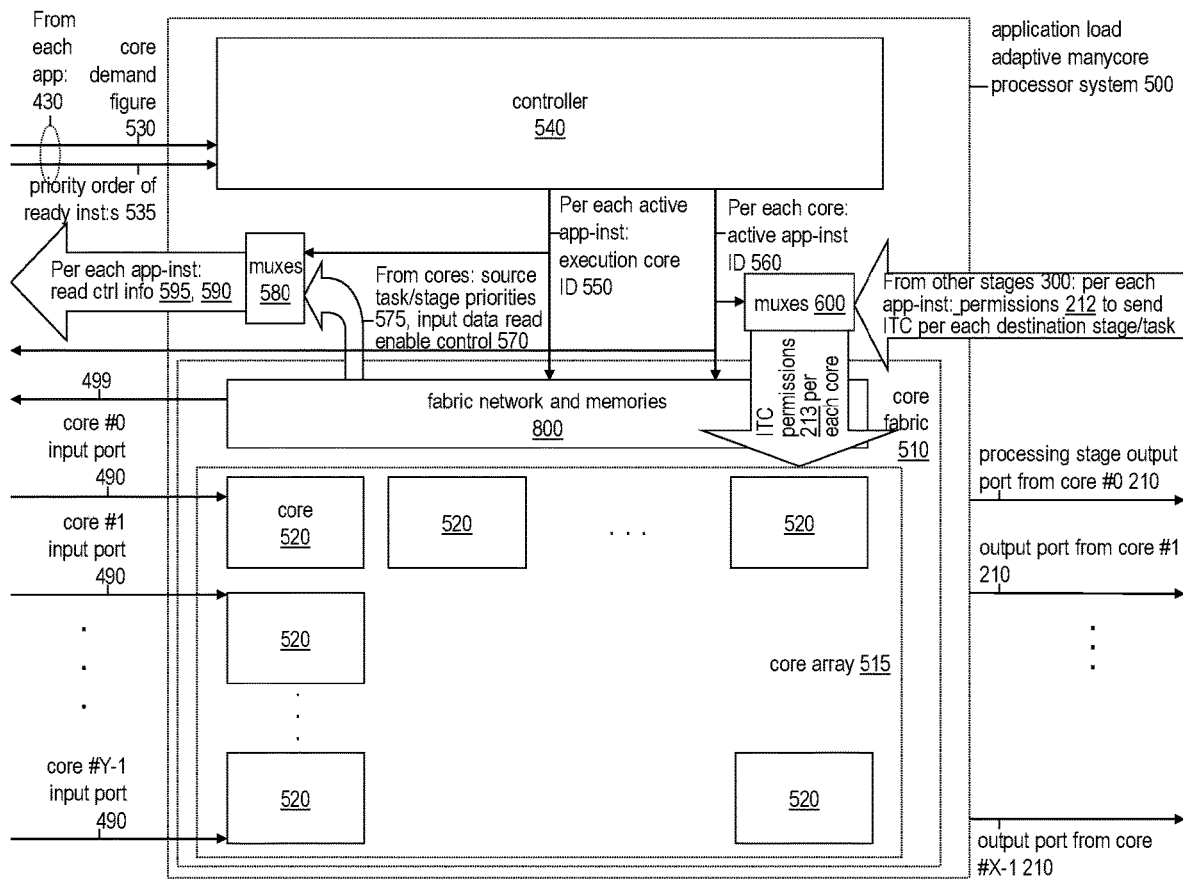
FIG. 7 shows, in accordance with an embodiment of the invention, a functional block diagram for the application load adaptive manycore processor of a processing stage of the multi-stage processing system per preceding FIGS.

From here, we continue by exploring the internal structure and operation of a given processing stage 300 beyond its RX logic per FIGS. 3-5, with references to FIGS. 6 and 7.

Per FIG. 6, any of the processing stages 300 of the multi-stage system 1 per FIG. 2 has, besides the RX logic 201 and the actual manycore processor system (FIG. 7), an input multiplexing subsystem 450, which connects input data packets from any of the app-instance specific input ports 290 to any of the processing cores 520 of the processing stage, according to which app-instance is executing at any of the cores at any given time.

The monitoring of the buffered input data availability 261 at the destination app-instance FIFOs 260 of the processing stage RX logic enables optimizing the allocation of processing core capacity of the local manycore processor among the application tasks hosted on the given processing stage. Since the controller module 540 of the local manycore processor determines which instances of the locally hosted tasks of the apps in the system 1 execute at which of the cores of the local manycore array 515, the controller is able to provide the dynamic control 560 for the muxes 450 per FIG. 6 to connect the appropriate app-instance specific input data port 290 from the stage RX logic to each of the core specific input data ports 490 of the manycore array of the local processor.

Internal elements and operation of the application load adaptive manycore processor system 500 are illustrated in FIG. 7. For the intra processing stage discussion, it shall be recalled that there is no more than one task located per processing stage per each of the apps, though there can be up to X (a positive integer) parallel instances of any given app-task at its local processing stage (having an array 515 of X cores). With one task per application per processing stage 300, the term app-instance in the context of a single processing stage means an instance of an app-task hosted at the given processing stage under study.

FIG. 7 provides a functional block diagram for the manycore processor system dynamically shared among instances of the locally hosted app-tasks, with capabilities for application input data load adaptive allocation of the cores 520 among the applications and for app-inst execution priority based assignment of the cores (per said allocation), as well as for accordantly dynamically reconfigured 550, 560 I/O and memory access by the app-insts.

As illustrated in FIG. 7, the processor system 500 comprises an array 515 of processing cores 520, which are dynamically shared among instances of the locally hosted tasks of the application programs configured to run on the system 1, under the direction 550, 560 of the hardware logic implemented controller 540. Application program specific logic functions at the RX module (FIG. 3-5) signal their associated applications' capacity demand indicators 430 to the controller. Among each of these indicators, the core-demand-figures (CDFs) 530, express how many cores their associated app is presently able utilize for its (ready to execute) instances. Each application's capacity demand expressions 430 for the controller further include a list of its ready instances in an execution priority order 535.

Any of the cores 520 of a processor per FIG. 7 can comprise any types of software program and data processing hardware resources, e.g. central processing units (CPUs), graphics processing units (GPUs), digital signal processors (DSPs) or application specific processors (ASPs) etc., and in programmable logic (FPGA) implementation, the core type for any core slot 520 is furthermore reconfigurable per expressed demands of its assigned app-task, e.g. per [1], Appendix A, Ch. 5.5.

The hardware logic based controller 540 module within the processor system, through a periodic process, allocates and assigns the cores 520 of the processor among the set of applications and their instances based on the applications' core demand figures (CDFs) 530 as well as their contractual core capacity entitlements (CEs). This application instance to core assignment process is exercised periodically, e.g. at intervals such as once per a defined number (for instance 64, 256 or 1024, or so forth) of processing core clock or instruction cycles. The app-instance to core assignment algorithms of the controller produce, per the app-instances on the processor, identification 550 of their execution cores (if any, at any given time), as well as per the cores of the fabric, identification 560 of their respective app-instances to execute. Moreover, the assignments 550, 560 between app-insts and the cores of the array 515 control the access between the cores 520 of the fabric and the app-inst specific memories at the fabric network and memory subsystem 800 (which can be implemented e.g. per [1] Appendix A, Ch. 5.4).

The app-instance to core mapping info 560 also directs the muxing 450 of input data from the RX buffers 260 of an appropriate app-instance to each core of the array 515, as well as the muxing 580 of the input data read control signals (570 to 590, and 575 to 595) from the core array to the RX logic submodule (FIG. 5) of the app-instance that is assigned for any given core 520 at any given time.

Similarly, the core to app-inst mapping info 560 also directs the muxing 600 of the (source) app-instance specific ITC permit signals (212 to 213) from the destination processing stages to the cores 520 of the local manycore array, according to which app-instance is presently mapped to which core.

Further reference specifications for aspects and embodiments of the invention are in the references [1] through [10].

The functionality of the invented systems and methods described in this specification, where not otherwise mentioned, is implemented by hardware logic of the system (wherein hardware logic naturally also includes any necessary signal wiring, memory elements and such).

Generally, this description and drawings are included to illustrate architecture and operation of practical embodiments of the invention, but are not meant to limit the scope of the invention. For instance, even though the description does specify certain system elements to certain practical types or values, persons of skill in the art will realize, in view of this description, that any design utilizing the architectural or operational principles of the disclosed systems and methods, with any set of practical types and values for the system parameters, is within the scope of the invention. Moreover, the system elements and process steps, though shown as distinct to clarify the illustration and the description, can in various embodiments be merged or combined with other elements, or further subdivided and rearranged, etc., without departing from the spirit and scope of the invention. Finally, persons of skill in the art will realize that various embodiments of the invention can use different nomenclature and terminology to describe the system elements, process phases etc. technical concepts in their respective implementations. Generally, from this description many variants and modifications will be understood by one skilled in the art that are yet encompassed by the spirit and scope of the invention.

What is claimed is:

1. A system comprising a plurality of hardware-implemented manycore processors, each including an array of Field Programmable Gate Array (FPGA) cores, the plurality of manycore processors connected by a packet switching network, each given manycore processor configured as a local manycore processor to concurrently implement in hardware:
   a plurality of application tasks, including at least one local application task running on the local manycore processor and configured to process input packet data originating from multiple sources, the multiple sources including at least one remote application task hosted on at least one remote manycore processor of the plurality of manycore processors;
   First-In-First-Out (FIFO) packet buffer control hardware logic to control read and write packet data operations, for each of a plurality of FIFO buffers;
   receive hardware logic in communication with the FIFO packet buffer control hardware logic, the receive hardware logic configured to
      inspect each given packet of a plurality of first packets received for delivery to the at least one local application task, the plurality of first packets including one or more packets received from the at least one remote application task, select, based at least in part on source information for each given packet, a corresponding FIFO buffer for each given packet, and
      direct the FIFO packet buffer control hardware logic to write packet data from each given packet to the selected corresponding FIFO buffer for that given packet;
   prioritization hardware logic in communication with the FIFO packet buffer control hardware logic, the prioritization logic configured to
      based at least in part on FIFO buffer fill level data of at least some of the plurality of FIFO buffers, select an order for packet data from the plurality of FIFO buffers to be presented as input packet data to the at least one local application task, and direct the FIFO packet buffer control hardware logic to read and transmit packet data from the plurality of FIFO buffers to the at least one local application task in the selected order; and
   send permission hardware logic configured to
      based at least in part on the FIFO buffer fill level data of at least one of the FIFO buffers, determine a respective sending permission for each of the remote manycore processors or each of the remote application tasks, and based at least in part upon changes in the respective sending permissions for each of the remote manycore processors or each of the remote application tasks, cause the local manycore processor to transmit a send permission signal to one or more of the remote manycore processors.

2. The system of claim 1, wherein on each of the plurality of manycore processors, the plurality of FIFO buffers are instantiated on the FPGA cores included on that manycore processor.

3. The system of claim 1, wherein each given manycore processor is further configured to:
   connect to and control access to a respective fast-access memory; and
   provide application-task specific access to the respective fast-access memory, for the at least one local application task.

4. The system of claim 1, wherein each given manycore processor is further configured to concurrently implement a second application task configured to process input packet data, other than packet data targeted to the first application task, received from one or more remote ones of the plurality of manycore processors.

5. The system of claim 1, wherein on each remote one of the manycore processors, the at least one remote application task is configured to:
   receive send permission signals from the send permission hardware logic configured on the given manycore processor; and
   based on send permission signals received from the given manycore processor, control a rate of packet data sent to the local application task on the given manycore processor.

6. The system of claim 1, wherein the FIFO buffer fill level data for each of the plurality of FIFO buffers comprises a per-buffer priority.

7. The system of claim 1, wherein the FIFO buffer fill level data comprise a statistic for each of the plurality of FIFO buffers that indicates whether or not that particular one of the FIFO buffers has a current FIFO buffer fill level above a monitoring threshold.

8. The system of claim 7, wherein the monitoring threshold is configured at a level that leaves room in a given FIFO buffer for at least one additional data packet.

9. A method of operating a system comprising a plurality of hardware-implemented manycore processors, each including an array of Field Programmable Gate Array (FPGA) cores, the plurality of manycore processors connected by a packet switching network, the method comprising:
   configuring each manycore processor as a local manycore processor to concurrently implement in hardware
      a plurality of application tasks, including at least one local application task running on the local manycore processor and configured to process input packet data originating from multiple sources, the multiple sources including at least one remote application task hosted on at least one remote manycore processor of the plurality of manycore processors, First-In-First-Out (FIFO) packet buffer control hardware logic to control read and write packet data operations, for each of a plurality of FIFO buffers, receive hardware logic, prioritization hardware logic, and send permission hardware logic;
   by the receive hardware logic on each respective local manycore processor, inspecting each given packet of a plurality of first packets received for delivery to the at least one local application task, the plurality of first packets including one or more packets received from the at least one remote application task, selecting, based at least in part on source information for each given packet, a corresponding FIFO buffer for each given packet, and directing the FIFO packet buffer control hardware logic to write packet data from each given packet to the selected corresponding FIFO buffer for that given packet;

by the prioritization hardware logic on each respective local manycore processor, based at least in part on FIFO buffer fill level data of at least one of the plurality of FIFO buffers, selecting an order for packet data from the plurality of FIFO buffers to be presented as input packet data to the at least one local application task, and directing the FIFO packet buffer control hardware logic to read and transmit packet data from the plurality of FIFO buffers to the at least one local application task in the selected order; and by the send permission hardware logic on each respective local manycore processor, based at least in part on the FIFO buffer fill level data of at least some of the plurality of FIFO buffers, determining a respective sending permission for each of the remote manycore processors or each of the remote application tasks, and based at least in part upon changes in the respective sending permissions for each of the remote manycore processors or each of the remote application tasks, causing the respective local manycore processor to transmit a send permission signal to one or more of the remote manycore processors.

10. The method of claim 9, further comprising switching the first plurality of packets, for each of the plurality of manycore processors, through the packet switching network.

11. The method of claim 9, further comprising, on each of the plurality of manycore processors, instantiating the plurality of FIFO buffers on the FPGA cores included on that manycore processor.

12. The method of claim 9, further comprising configuring each manycore processor to:
connect to and control access to a respective fast-access memory; and
provide application-task specific access to the respective fast-access memory, for the at least one local application task.

13. The method of claim 9, further comprising configuring each respective local manycore processor to concurrently implement a second application task, and, by the second application task, processing input packet data, other than packet data targeted to the first application task, received from one or more remote ones of the plurality of manycore processors.

14. The method of claim 9, further comprising on each one of the manycore processors remote to the respective local manycore processor: configuring the at least one remote application task; and, by the at least one remote application task,
receiving send permission signals from the send permission hardware logic configured on the respective local manycore processor; and
based on send permission signals received from the given manycore processor, controlling a rate of packet data sent to the local application task on the given manycore processor.

15. The method of claim 9, wherein the FIFO buffer fill level data for each of the plurality of FIFO buffers comprises a per-buffer priority.

16. The method of claim 9, wherein the FIFO buffer fill level data comprise a statistic for each of the plurality of FIFO buffers that indicates whether or not that particular one of the FIFO buffers has a current FIFO buffer fill level above a monitoring threshold.

17. The method of claim 16, further comprising configuring the monitoring threshold at a level that leaves room in a given FIFO buffer for at least one additional data packet.

* * * * *